US012785754B2

(12) United States Patent
Cirillo et al.

(10) Patent No.: US 12,785,754 B2
(45) Date of Patent: Nov. 3, 2026

(54) DITHER-COMPENSATED CALIBRATION

(71) Applicant: STMicroelectronics International N.V., Geneva (CH)

(72) Inventors: Giovanni Amedeo Cirillo, Turin (IT); Kevin Luciani, Milan (IT); Andrea Lorenzo Vitali, San Jose, CA (US); Claudio Fornaro, Pavia (IT)

( * ) Notice: Subject to any disclaimer, the term of this patent is extended or adjusted under 35 U.S.C. 154(b) by 203 days.

(21) Appl. No.: 18/828,361

(22) Filed: Sep. 9, 2024

(65) Prior Publication Data

US 2026/0074745 A1 Mar. 12, 2026

(51) Int. Cl.
*H04B 5/79* (2024.01)
*H02J 50/12* (2016.01)
*H02J 50/80* (2016.01)
*H04L 27/06* (2006.01)

(52) U.S. Cl.
CPC ................ *H04B 5/79* (2024.01); *H02J 50/80* (2016.02); *H04L 27/06* (2013.01); *H02J 50/12* (2016.02)

(58) Field of Classification Search
CPC ............ H04B 5/79; H02J 50/80; H02J 50/12; H04L 27/06; H04L 2027/0016; H03D 7/16
See application file for complete search history.

(56) References Cited

U.S. PATENT DOCUMENTS

| | | | | |
|---|---|---|---|---|
| 1,093,326 | A | 4/1914 | Haskell | |
| 8,411,799 | B1 | 4/2013 | Jones | |
| 9,459,295 | B2 | 10/2016 | Wertz | |
| 11,043,953 | B2 * | 6/2021 | Hammerschmidt | H03B 5/1265 |
| 11,811,442 | B2 | 11/2023 | de Ruijter | |
| 11,870,449 | B2 | 1/2024 | Banin | |
| 12,401,227 | B1 * | 8/2025 | Schwartz | H02J 50/10 |
| 2019/0067995 | A1 * | 2/2019 | Schaevitz | H02J 50/12 |
| 2023/0370115 | A1 | 11/2023 | Schwartz | |
| 2024/0146111 | A1 * | 5/2024 | Bhandarkar | H02J 50/10 |

OTHER PUBLICATIONS

Sergio Franco, "Design with Operational Amplifiers and Analog Integrated Circuits", 4. Active Filters: Part II; 4.1 Filter Approximations; and 4.2: Cascade Design, vol. 1988, 2002, McGraw-Hill, New York, Total Pages 09.

(Continued)

*Primary Examiner* — Curtis A Kuntz
(74) *Attorney, Agent, or Firm* — Slater Matsil, LLP

(57) ABSTRACT

According to an embodiment, a method for calibrating a local oscillator in an Amplitude Shift Keying (ASK) demodulator of a wireless power transmitter is proposed. The method includes receiving a digital signal corresponding to a voltage or a current of a transmitter coil in a wireless power system implemented with frequency dithering; iteratively adjusting counter values associated with a dithering table of the local oscillator; wherein for each iteration, the method comprises generating in-phase (I) and quadrature (Q) components using the local oscillator, computing a metric based on the I and Q components, and storing the counter values if the computed metric surpasses a previously stored best metric; and configuring the local oscillator with the stored counter values associated with the best metric.

20 Claims, 9 Drawing Sheets

(56) References Cited

OTHER PUBLICATIONS

Richard G. Lyons, "Understanding Digital Signal Processing, 3/E", Chapter 3: The Discrete Fourier Transform, Chapter 4: The Fast Fourier Transform, and 13.17: Single Tone Detection, 3rd Edition, Pearson Education India, 1997, Total Pages 114.
Andreas Antoniou, "Digital Signal Processing", Chapter 8: Realization of Digital Filters, 2006, McGraw-Hill, New York, Total Pages 29.
Dante Del Corso et al., "Telecommunication Electronics", 1. Radio System Architectures, and 3. Frequency Conversion Circuits; 3.1: Frequency Mixers, 2020, Artech House, Boston, London, Total Pages 28.
Proakis, John G. et al., "Digital Communications", 2. Deterministic and Random Signal Analysis; 2.1: Bandpass and Lowpass Signal Representation, 2.2: Signal Space Representation of Waveforms, McGraw-Hill, 2007, New York, Total Pages 23.
Fuqin Xiong, "Digital Modulation Techniques", Appendix A: Power Spectral Densities of Signals, 2006, Artech House, Boston, London, Total Pages 21.
Ian Glover et al., "Digital Communications", 11.3.1. Binary Amplitude Shift Keying, 1998, Prentice Hall, Europe, Total Pages 06.
Leon W. Couch, "Digital and Analog Communications Systems", Chapter 5: Am, Fm, and Digital Modulated Systems; 5-1: Amplitude Modulation, 5th Edition, 1996, Prentice Hall, United States, Total Pages 04.
Antoniou, Andreas, "Digital signal processing," Signals, System and Filters, McGraw-Hill, 2006, DOI: 10.1036/0071454241, published Jan. 1, 2006, 991 pages.
Lyons, Richard G., "Understanding digital signal processing," Third Edition, Pearson Education India, 1997, Published Nov. 1, 2010, ISBN-13: 978-0-13-702741-5, ISBN: 0-13-702741-9, 858 pages.
Mueller, Kurt H et al., "Timing Recovery in Digital Synchronous Data Receivers," in IEEE Transactions on Communications, vol. COM-24, No. 5, doi: 10.1109/TCOM. 1976.1093326, May 1976, pp. 516-531.
Saltzberg, B. R., "Timing recovery for synchronous binary data transmission," in The Bell System Technical Journal, vol. 46, No. 3, doi: 10.1002/j.1538-7305.1967.tb04235.x, Mar. 1967, pp. 593-622.

* cited by examiner

DITHER-COMPENSATED CALIBRATION

TECHNICAL FIELD

The present disclosure generally relates to electronic devices and, in particular embodiments, to calibrating a dither-compensated down conversion mixer for amplitude shift keying (ASK) demodulators in wireless power transmitters.

BACKGROUND

In wireless power transfer, inductive charging emerges as a useful technique for transmitting energy from a transmitter to a receiver. Inductive charging utilizes the principle of inductive coupling, also known as mutual induction, between two coils—one in each terminal—to facilitate power transfer and communication between the transmitter and the receiver. The transmitter can be a battery charger, while the receiver can be devices such as smartphones or sensors. To enable bidirectional communication, the receiver can employ backscatter modulation, which involves applying Amplitude-Shift Keying (ASK) modulation to the current or voltage in the primary coil by varying the load impedance. For effective operation, integrated drivers within the transmitter can include circuits capable of demodulating and recognizing incoming messages.

SUMMARY

Technical advantages are generally achieved by embodiments of this disclosure, which describe calibrating a dither-compensated down conversion mixer for amplitude shift keying (ASK) demodulators in wireless power transmitters.

A first aspect relates to a method for calibrating a local oscillator in an Amplitude Shift Keying (ASK) demodulator of a wireless power transmitter. The method includes receiving a digital signal corresponding to a voltage or a current of a transmitter coil in a wireless power system implemented with frequency dithering; iteratively adjusting counter values associated with a dithering table of the local oscillator; wherein for each iteration, the method comprises generating in-phase (I) and quadrature (Q) components using the local oscillator, computing a metric based on the I and Q components, and storing the counter values if the computed metric surpasses a previously stored best metric; and configuring the local oscillator with the stored counter values associated with the best metric.

A second aspect relates to a circuit for calibrating a local oscillator in an Amplitude Shift Keying (ASK) demodulator of a wireless power transmitter. The circuit includes an analog-to-digital converter (ADC) configured to receive a signal corresponding to a voltage or a current of a transmitter coil in a wireless power system implemented with frequency dithering; a local oscillator configured to generate in-phase (I) and quadrature (Q) components based on counter values associated with a dithering table; and a processing circuit configured to iteratively adjust the counter values, compute a metric based on the I and Q components for each iteration, and store the counter values if the computed metric surpasses a previously stored best metric, wherein the local oscillator is further configured to use the stored counter values associated with the best metric for subsequent operation.

A third aspect relates to a wireless power system. The wireless power system includes a transmitter coil and an Amplitude Shift Keying (ASK) demodulator circuit coupled to the transmitter coil and configured to demodulate backscatter-modulated signals. The ASK demodulator includes a local oscillator implemented with frequency dithering, a calibration circuit configured to receive a digital signal corresponding to a voltage of the transmitter coil; iteratively adjust counter values associated with a dithering table of the local oscillator; and configure the local oscillator with the stored counter values associated with the best metric. For each iteration, the calibration circuit is configured to generate in-phase (I) and quadrature (Q) components using the local oscillator; compute a metric based on the I and Q components; and store the counter values if the computed metric surpasses a previously stored best metric.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
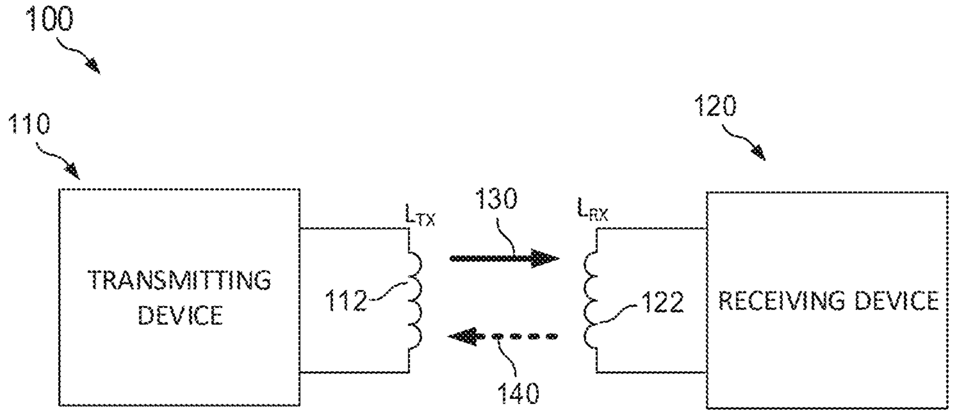
FIG. 1 is an embodiment wireless power system.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a Qi-compliant wireless power system and amplitude-shift keying (ASK) modulation, it should also be appreciated that these inventive aspects may also be applicable to any other type of amplitude modulation (AM) scheme or similar encoding schemes. Further, embodiments of the present invention may operate without complying with the Qi standard.

In wireless power transfer systems, a power receiver can communicate with a power transmitter using backscatter modulation (e.g., ASK modulation). The transmitter can employ a PWM-generated square wave that is filtered to produce a sinusoidal signal in the power transmitter coil, which induces a sinusoidal signal in the power receiver coil and behaves as a carrier of the backscatter-modulation-based communication. The carrier can be subjected to frequency dithering to spread the signal energy and reduce peak emissions. However, the dithering can introduce disturbances in the demodulation process.

Embodiments of the disclosure present a method for calibrating a local oscillator with frequency dithering, designed for use in the mixer of an Amplitude Shift Keying (ASK) demodulator. The proposed calibration approach integrates hardware demodulation components with firmware-controlled processes to optimize the demodulator's performance.

In embodiments, the firmware is responsible for controlling the activation and deactivation of the Analog-to-Digital Converter (ADC), selecting the initial configuration parameters for the local oscillator, and calculating a calibration metric to assess the quality of each setup. The iterative approach allows the wireless power system to systematically explore various oscillator configurations.

Aspects of the disclosure advantageously provide a calibration process of a local oscillator that can accurately mimic the dithering pattern of the incoming external signal on a sample-by-sample basis. By aligning the local oscillator's behavior closely with the external signal's dithering pattern, the proposed method significantly reduces the disturbances caused by frequency dithering in the demodulated signal. Reducing dithering-related disturbances enhances the overall quality and reliability of the ASK demodulation process, particularly in applications where precise signal interpretation is advantageous, such as communication interfaces of wireless power transfer systems.

Aspects of the disclosure address this issue by implementing a calibration routine that identifies the optimal initial setup for local oscillator counters. The calibration routine ensures proper alignment between the sine waves sampled by an ADC of the power transmitter and those generated in an ASK demodulator circuit of the power transmitter. The calibration process maps the delay between the PWM-generated signal and the ADC-sampled signal onto an address difference in the dithering table pointers used by the ASK demodulator circuit and PWM timer circuit.

In embodiments, the calibration algorithm operates during the silent time between ASK communications. It can iteratively test different initial setups for the local oscillator, compute a metric based on spectral analysis of the down-converted signal, and select the setup that maximizes the DC component while minimizing the dithering disturbance. The setup selection can be achieved by analyzing the energy spread between the DC and dithering fundamental frequencies in the demodulated signal spectrum.

In embodiments, existing hardware in the ASK demodulator circuit, such as numerically-controlled local oscillators and Cascaded Integrator-Comb (CIC) filters, and firmware processing are utilized to compute the calibration metric. Various implementations are proposed, including full spectral analysis and simplified DC-only solutions. The calibration can be performed using samples from different stages of the demodulation chain, allowing flexibility in implementation across different hardware architectures.

Advantageously, embodiments of the disclosure provide the ability to map the external delay onto variations in the counters of the dither-compensated local oscillator. The mapping ensures proper alignment between the external signal and the local oscillation for effective demodulation. Further, the calibration process is advantageously independent of the ASK modulation depth, making it more versatile and robust across different signal conditions. Moreover, the calibration of the local oscillator results in a significant reduction of disturbances associated with the dithering fundamental.

By optimizing the alignment between the local oscillator and the received signal, embodiments of the disclosure improve the signal-to-noise ratio (SNR) of the demodulated signal and enhance the overall performance of the ASK demodulation in wireless power transfer systems. The proposed approach eliminates additional hardware filters and provides a more efficient solution than a fixed mean frequency for the local oscillator. These and additional details are further detailed below.

FIG. 1 illustrates an embodiment wireless power system 100, which may also be called a wireless charging system. The system includes a transmitting device 110 and a receiving device 120, which may (or may not) be arranged as shown. The transmitting device 110 generates and transmits wireless energy 130 to the receiving device 120.

The transmitting device 110 may be a base station, for example, a charging pad, which provides inductive power to the receiving device 120. The receiving device 120 may be, for example, a mobile device, a tablet, a cellular phone, a wearable communications device (e.g., a smartwatch), a digital pen, a wireless headphone, a toothbrush, a sensor, internet of things (IoT) device, or the like. The receiving device 120 is the consumer of inductive power.

The transmitting device 110 includes a transmitter coil 112 ($L_{TX}$). The receiving device 120 includes receiver coil 122 ($L_{RX}$). Each coil, or winding, can be a loop or magnetic antenna. The coils may have a physical core (e.g., ferrite core) or an air core. The coils may be implemented as an antenna strip or using a Litz wire. The resonant frequency of each coil is based on the shape and size of the looping wire or coil. In some embodiments, additional capacitance and inductance may be added to each coil to create a resonant structure at the desired resonant operating frequency.

In embodiments, the wireless energy 130 is transmitted from the transmitting device 110 to the receiving device 120 using resonant inductive coupling between the transmitter coil 112 and the receiver coil 122. The receiving device 120 may use the power to charge rechargeable batteries or power the components within it directly.

Figure 2:
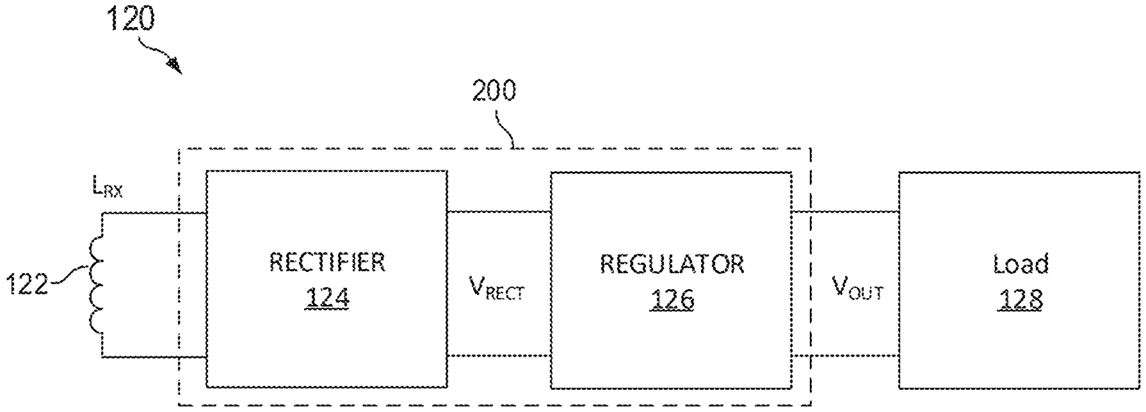
FIG. 2 is an embodiment receiving device.

FIG. 2 illustrates an embodiment receiving device 120. The receiving device 120 includes the receiver coils 122, a power charging circuit 200, and a load 128. The power charging circuit 200 includes a rectifier 124 and a regulator 126. The receiving device 120 may include additional components not depicted in FIG. 2, such as long-term storage (e.g., non-volatile memory, etc.), a non-transitory computer-readable medium, one or more antenna elements, drivers, demodulators, modulators, filter circuits, and impedance matching circuits.

The rectifier 124 converts the alternating current (AC) voltage at the receiver coils 122 to a direct current (DC) voltage. It may be any type of rectifier, such as a low-impedance synchronous rectifier having full-wave or halfwave rectification or an active rectifier. In embodiments, the rectifier 124 may be a bridge rectifier; however, other types of rectifiers are also contemplated.

The regulator 126 receives a voltage ($V_{RECT}$) from the rectifier 124 and then regulates that voltage to maintain a constant output voltage ($V_{OUT}$) at load 128. The regulator 126 may be any type of voltage regulator, such as a linear regulator (e.g., low drop-out (LDO) linear regulator). In some embodiments, the rectifier 124 and the regulator 126 may be part of a switched-mode power supply (SMPS) circuit.

As shown, load 128 is the primary benefactor of the transferred wireless energy 130. The load 128 may be a charge storage device, such as a battery. For instance, load 128 may be a cellular phone battery or a smartwatch. For example, the transmitting device 110 may be a charging pad and a smartwatch may be placed on the charging pad. The charging pad transfers wireless power to the smartwatch's battery without connecting cables between the two devices.

Several interface standards have been developed to standardize wireless power transfer and related functions. One such interface standard is Qi, which the Wireless Power Consortium (WPC) promotes. Qi and similar standardized protocols may be used to define the communication interface for controlling the power transfer in the wireless power system 100. For instance, the receiving device 120 may request a change (e.g., an increase, a decrease, a pause, etc.) related to the transferred wireless energy 130 from the transmitting device 110.

The mechanism of inductive power transfer can also be utilized for communication between the transmitting device 110 and the receiving device 120. For instance, the receiving device 120 can inform the transmitting device 110 when the charging process is complete. This communication can be facilitated through a technique known as backscatter modulation, as specified in the Qi Standard for inductive wireless power transfer.

In practice, the receiving device 120 can alter its load impedance by, for example, changing the impedance of the load 128. The change in the impedance results in observable variations in the amplitude of the current or voltage in the transmitter coil 112, allowing for transmitting information from the receiving device 120 to the transmitting device 110.

Figure 3:
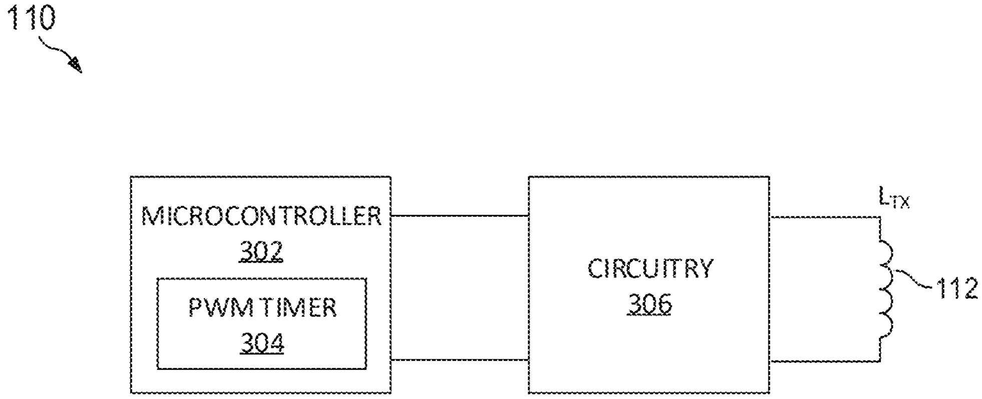
FIG. 3 is an embodiment transmitting device.

FIG. 3 illustrates an embodiment transmitting device 110. The transmitting device 110 includes a microcontroller 302, additional circuitry 306, and the transmitter coil 112, which may (or may not) be arranged as shown. Transmitting device 110 may include memory for storage. In embodiments, microcontroller 302 includes embedded memory. In embodiments, the PWM timer circuit 304 is embedded within the microcontroller 302.

Generally, a digital modulation scheme represents digital data using a finite number of distinct signals. ASK modulation refers to a modulation scheme in which digital data is represented as variations in the amplitude of a carrier wave.

In ASK-based communication, the transmitting device 110 generates a carrier signal. The carrier signal is typically a sinusoidal wave produced by filtering a PWM-generated square wave. The digital information to be transmitted modulates the amplitude of the carrier signal.

In embodiments, the PWM timer circuit 304 embedded within the microcontroller 302 generates a PWM square wave based on programmed parameters. Microcontroller 302 can precisely control the square wave's frequency, duty cycle, and timing. In systems that employ dithering, the microcontroller 302 can also manage the periodic variations in the PWM frequency according to the predefined dithering pattern stored in its memory.

At the transmitting device 110, the PWM signal can be subjected to a controlled, periodic perturbation of its period/frequency, known as dithering. Dithering results in an analogous periodic variation of the sinusoidal current and voltage (i.e., periodic variation of the ASK carrier frequency) at the transmitter coil 112. Dithering spreads the spectrum of the PWM signal across multiple frequencies, effectively lowering the peaks associated with the main harmonics of the square wave.

Dithering distributes the signal energy over a wider frequency range, spreading the energy across a broader range of harmonics. It particularly affects frequencies with non-zero contributions in the non-dithered signal spectrum, such as the odd harmonics of the square wave, whose spectral contribution is lowered by dithering. The distribution minimizes the overall electromagnetic impact, making the power transfer process more compliant with electromagnetic compatibility standards and beneficial for reducing peak emissions. Accordingly, dithering can reduce electromagnetic interference emissions in the power transfer mechanism.

PWM timer circuit 304 can employ frequency dithering by slightly varying the signal frequency according to a predetermined pattern stored in a dithering table. The modulated and dithered signal is sent to the transmitter coil, generating an electromagnetic field for power transfer and data communication. The approach allows for simultaneous power transfer and data transmission, with the data essentially riding on the power transfer signal.

After PWM timer circuit 304 generates the digital square wave, it is passed through additional circuitry 306, such as a power inverter and a filter, to create a sinusoidal wave used in the inductive power transfer process. The receiving device 120 rectifies the induced signal at the receiver coil 122, which charges the receiving device 120. In embodiments, the resonant filtering is performed by a capacitor and the transmitter coil 112.

Figure 4:
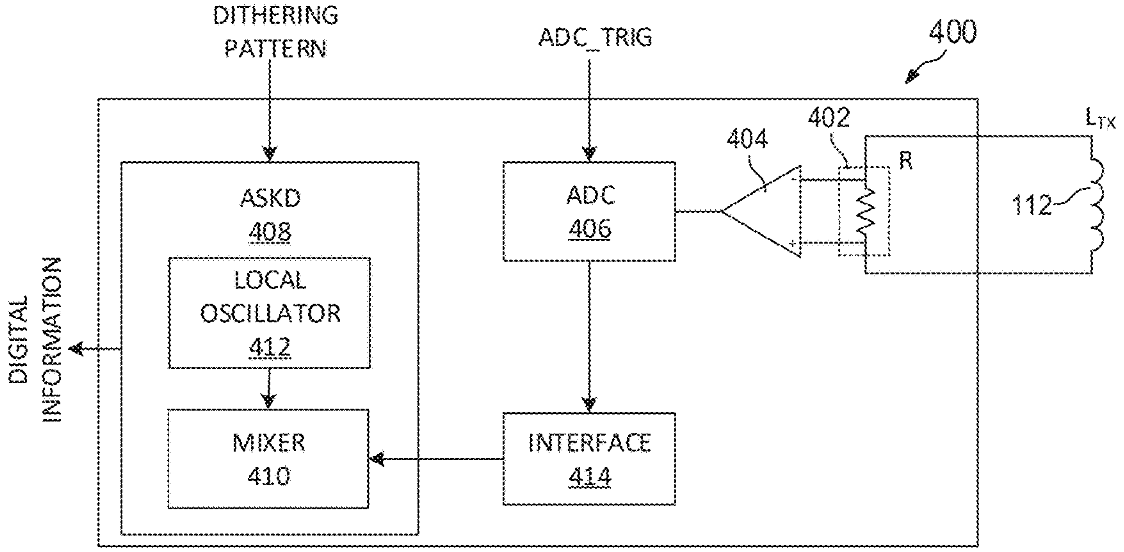
FIG. 4 is a schematic of an embodiment sensing circuit.

FIG. 4 illustrates a schematic of an embodiment sensing circuit 400, which may be in transmitting device 110 for backscatter modulation detection. Sensing circuit 400 is coupled to the terminals of the transmitter coil 112. Sensing circuit 400 includes a sense resister (R) 402, an amplifier 404, an analog-to-digital converter (ADC) 406, an ASK demodulator circuit 408, and an interface 414, which may (or may not) be arranged as shown. Sensing circuit 400 may include additional components not shown.

When the receiving device 120 modulates its load 128 (for example, by changing its impedance), this causes detectable changes in the current or voltage of the transmitter coil 112. The changes are typically small amplitude variations in the current or voltage at the transmitter coil 112. Sensing circuit 400 continuously monitors the characteristics of the transmitter coil 112, such as current or voltage.

The sense resistor 402 is arranged in series to detect these variations with the transmitter coil 112. The voltage across the sense resistor 402 is proportional to the coil current. The amplifier 404 amplifies the voltage across the sense resistor 402 and feeds it into the ADC 406.

In embodiments, a dedicated timer circuit within the microcontroller 302 transmits an ADC trigger (ADC_TRIG) signal to ADC 406, serving two primary functions. First, when a triggered mode is selected and enabled, the enabling edge (rising or falling) of the ADC trigger signal initiates a hardware start of conversion. Second, regardless of the mode, the enabling edge of the ADC trigger signal marks the subsequent ADC packet with a START flag. The synchronization mechanism ensures that the ADC sampling always begins from a consistent point within the dithering pattern, regardless of the ADC's operational state.

The synchronization is advantageous in scenarios where the ADC 406 is temporarily disabled, such as during FSK communication from the transmitting device 110 to the receiving device 120 or before a metric calculation. When the ADC 406 is reactivated, the ADC trigger signal ensures that sampling resumes from the same relative point in the dithering pattern. The consistency allows the integrity of the dither-compensated demodulation process to be maintained Further, by generating the ADC trigger signal with a period matching that of the dithering pattern, each iteration of the calibration or demodulation process is guaranteed to work with an identical set of samples. The repeatability is advantageous for accurate comparisons between different calibration attempts and ensures that the optimization process is based on consistent data across multiple iterations.

ADC 406 converts the amplified analog voltage across the sense resistor 402 to a digital signal. In embodiments, ADC 406 is coupled to the ASK demodulator circuit 408 through the interface 414. In embodiments, interface 414 involves both a serial data interface and a pre-conditioning digital signal processing unit, responsible of either removing residual DC components or band-pass filtering in the neighborhood of the ASK carrier frequency or windowing the incoming signal. In embodiments, interface 414 is a four-lane serial peripheral interface (SPI4L), followed by offset removal and a resonant-like digital filter. In embodiments, in response to the ADC 406 being enabled, a rising edge of the ADC trigger signal data indicates the continuous communication of ADC packets containing the digital signal corresponding to the amplified analog voltage sensed at the sense resistor 402.

ASK demodulator circuit 408 includes a mixer 410 and a local oscillator 412. In embodiments, ASK demodulator circuit 408 includes additional components not shown, such as low-pass filters, decimators, and other signal-processing components for ASK demodulation. In embodiments, ASK demodulator circuit 408 is embedded within microcontroller 302.

In embodiments, local oscillator 412 is a numerically-controlled oscillator circuit. In embodiments, local oscillator 412 is implemented using a COordinate Rotation DIgital Computer (CORDIC). CORDIC is an iterative algorithm for computing fixed-point trigonometric functions, exploiting algebraic sums, shifts, sign checks, and most multiplications. It should be appreciated that the functions of the mixer 410 and the local oscillator 412 can be implemented using other signal processing components and are not limited to a CORDIC I/Q generator circuit.

The digital signal from the ADC 406 is demodulated by the ASK demodulator circuit 408. ASK demodulator circuit 408 analyzes the amplitude variations in the digital signal to extract the digital information sent by the receiving device 120. ASK demodulator circuit 408 can employ the mixer 410 to downconvert the information signal to baseband. This process typically involves the incoming modulated signal, which contains both In-phase (I) and Quadrature (Q) components. The mixer 410 multiplies the digital signal from the ADC 406 with a local oscillator signal generated by the local oscillator 412. The local oscillator signal from the local oscillator 412 is typically generated to match the carrier frequency of the received signal.

The mixer 410 effectively shifts the frequency of the information signal down to baseband, where it is easier to process and extract the original data. The resulting baseband signal maintains its I and Q components, which represent the real and imaginary parts of the complex signal, respectively. The I and Q signals at baseband contain the amplitude variations that encode the transmitted information in ASK modulation. ASK demodulator circuit 408 can process the baseband I and Q signals to recover the original digital data by, for example, examining the amplitude changes in the complex signal formed by the I and Q components.

In ASK demodulation, frequency dithering introduces additional disturbance that can affect the demodulation process. In systems employing dithering, ASK demodulator circuit 408 accounts for the dithering pattern when interpreting the received signal. It uses knowledge of the dithering pattern to correctly interpret the amplitude variations caused by the receiver's load modulation, distinguishing them from variations caused by dithering from the transmitting device 110 during signal transmission.

In embodiments, local oscillator 412 includes an I/Q generator circuit. The I/Q generator circuit is configured to efficiently generate the in-phase (I) and quadrature (Q) components of a sinusoidal signal. The I and Q components represent the reference signal that should match the carrier of the incoming ASK signal, including its dithering pattern. The I/Q generator circuit produces the sine and cosine waveforms needed for demodulation. In embodiments, the I/Q generator circuit is a CORDIC I/Q generator circuit.

Local oscillator 412 may include additional components, such as a phase accumulator to keep track of the current phase, including dithering adjustments; dithering control circuitry to manage the dithering pattern based on the dithering table and counters, or control logic to manage the overall operation and synchronization of the local oscillator components.

Mixer 410 is arranged after the local oscillator 412 in the signal processing chain. It performs the multiplication of the incoming ASK signal with the locally generated I and Q signals from the I/Q generator circuit. The multiplication process effectively shifts the frequency of the incoming ASK signal down to baseband, separating the modulated information from the carrier.

Following the dithering pattern, the local oscillator 412 improves ASK demodulation and removes the dithering disturbance. The approach is feasible due to the knowledge of the dithering pattern, as the PWM timer circuit 304 and ASK demodulator circuit 408 are components embedded within transmitting device 110, and the local oscillator 412 can follow the dithering pattern.

Figure 5:
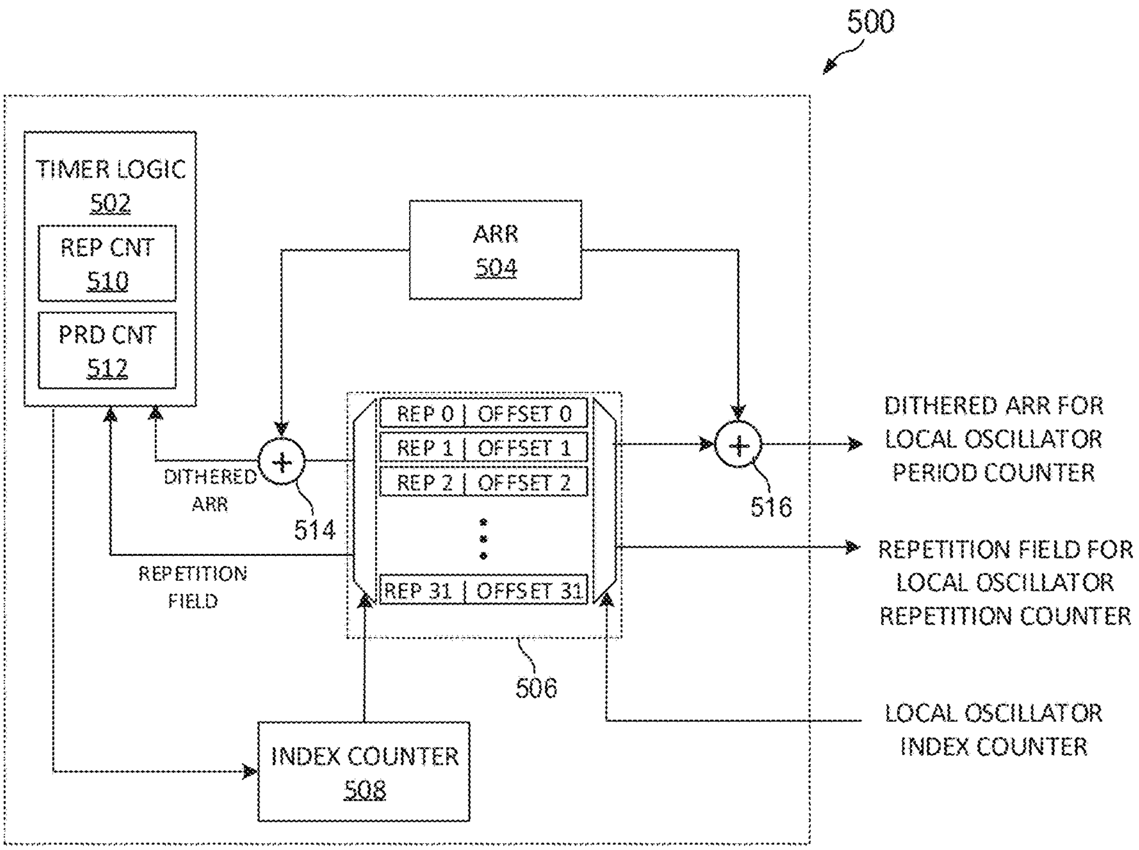
FIG. 5 is a block diagram of an embodiment PWM dithering timer circuit.

FIG. 5 illustrates a block diagram of an embodiment PWM dithering timer circuit 500. PWM dithering timer circuit 500 is employed by the PWM timer circuit 304 to implement frequency dithering. Further, the local oscillator 412 of the ASK demodulator circuit 408 replicates the dithering pattern generated by the PWM dithering timer circuit 500, used during ASK demodulation.

PWM dithering timer circuit 500 includes a timer logic circuit 502, an auto-reload register (ARR) 504, a dithering table 506, a PWM index counter 508, a first adder 514, and a second adder 516, which may (or may not) be arranged as shown. PWM dithering timer circuit 500 may include additional components not shown. PWM dithering timer circuit 500 may be implemented within the microcontroller 302 or within the PWM timer circuit 304.

Dynamic frequency dithering can be implemented through the dithering table 506 to introduce small variations in the carrier frequency. Dithering table 506 may be implemented as registers or embedded memory within the microcontroller 302. In embodiments, each entry within the dithering table 506 contains an offset field 522 and a slot repetition field 524. For example, if each entry is 8-bit, the first two bits can be allocated to the slot repetition field 524, and the next six bits can be allocated to the offset field 522. In embodiments, the offset field 522 contains signed entries.

The offset field 522 is added to the ARR 504 through the first adder 514 or the second adder 516 to obtain a dithered ARR value. The slot repetition field 526 determines how many switching cycles (e.g., 1, 2, or 4) the offset field 522 is to be employed.

In embodiments, a pattern length register ($P_{LENGTH}$) is available to set the effective length of the dithering table 506. For example, if the length of the dithering table 506 is 32-bits, the pattern length register is set to 5-bits (i.e., 32 equals 25).

In embodiments, PWM timer circuit 304 uses counters (e.g., registers) to manage the dithering pattern. For example, the PWM timer circuit 304 utilizes a PWM index counter 508 to keep track of the current position in the dithering table, a PWM repetition counter 510 to track how many times the current table entry has been used (i.e., how many times the current offset has been applied within its allocated slot), and a PWM period counter 512 (i.e., standard PWM count) that increments with each clock and is compared against the ARR to determine the end of a switching cycle.

In embodiments, the value of the PWM index counter 508 counter is PWM_IDX, the value of the PWM repetition counter 510 is PWM_REP, and the value of the PWM period counter 512 is PWM_CNT.

In embodiments, the local oscillator 412 replicates the dithering pattern at the PWM timer circuit 304. In embodiments, the counters (e.g., PWM index counter 508, PWM repetition counter 510, and PWM period counter 512) of the PWM timer circuit 304 are replicated for the local oscillator 412.

The value of the ARR 504 is modified during each switching cycle. As discussed above, the dithering table 506 includes an offset field containing a signed offset, which is added to the base ARR value. To enhance flexibility, each offset can be applied for up to four consecutive switching cycles, controlled by the repetition field within each table entry.

The timer logic circuit 502 applies the current offset from the dithering table 506 to ARR 504, modifying the PWM frequency.

The sinusoidal signal sampled by the sensing circuit 400 is delayed relative to the square wave generated by the PWM timer circuit 304. For example, the sampled signal is delayed by the analog circuitry of the wireless power transmitter and by filters in interface 414. Accordingly, during demodulation, the ASK demodulator circuit 408 must consider the delay to account for the frequency dithering properly.

In embodiments, the PWM timer circuit 304 and the local oscillator 412 use the dithering table 506 but with a separate pointer. Due to the aforementioned delay, the pointer for the PWM timer circuit 304 points to a different table entry than the pointer for the local oscillator 412. Accordingly, the pointer for the PWM timer circuit 304 is shifted with a time-constant address difference concerning the pointer for the local oscillator 412. For example, at any given moment, the pointer for the PWM timer circuit 304 can be several entries ahead of the pointer for the local oscillator 412.

Embodiments of this disclosure provide an approach for identifying and initializing the operation of the local oscillator 412 to ensure the proper alignment of the sinusoidal waves sampled by the sensing circuit 400. In embodiments, the signal starting the sample acquisition by the ADC 406 (e.g., the ADC trigger signal) has the same period as the signal associated with the dithering pattern. In embodiments, the time-constant address difference between the pointers for the PWM timer circuit 304 and the local oscillator 412 is associated with the address difference between the pointer for the PWM timer circuit 304 and the pointer for the local oscillator 412.

Werner's formula (i.e., the trigonometric product-to-sum formula) describes how the product of two sine waves can be expressed as a sum of other sinusoidal functions. Specifically, Werner's formula states that the product of two sine waves with frequencies $f_1$ and $f_2$ can be expressed as $$A_1\sin(2\pi f_1 t+\phi_1)\cdot A_2\sin(2\pi f_2 t+\phi_2)=\frac{A_1A_2}{2}[\cos(2\pi(|f_1-f_2+\phi_1-\phi_2|t)-\cos(2\pi(f_1+f_2+\phi_1+\phi_2)t)],$$

where $A_1$ and $A_2$ are the amplitudes of the two sine waves, $f_1$ and $f_2$ are their frequencies, $\phi_1$ and $\phi_2$ are their phase offsets, and t is time.

Accordingly, multiplying two sine waves results in two new sine waves: (1) a beat frequency component at $|f_1-f_2|$ and (2) an image frequency component at $f_1+f_2$.

In the context of signals with frequency dithering, Werner's formula takes on a dynamic aspect. When the two sine waves being multiplied are subject to frequency dithering, their instantaneous frequencies $f_1(t)$ and $f_2(t)$ are not constant but vary over time according to a predetermined pattern. As a result, the beat frequency, which is the difference between these two frequencies, also changes over time. The time-varying beat frequency means that the output of the mixer 410 (which multiplies the two sine wave signals) is not a simple DC component or a single-frequency sinusoid but rather a more complex signal whose frequency content changes dynamically.

When the frequencies of the local oscillator 412 and the digital signal from the ADC 406 are perfectly aligned, the beat frequency becomes 0 Hz, resulting in a DC component—the desired baseband signal—and the cancelation of the dithering disturbance. Subsequent low-pass filtering typically filters out the image frequency component.

Accordingly, the degree of alignment between the local oscillator 412 and the digital signal from the ADC 406 affects the quality of the demodulated output. When the dithering patterns of these two signals are well-aligned, the mixer 410 produces an output with distinct characteristics. Specifically, a higher degree of alignment results in a mixer output where the beat component, representing the difference between the two input frequencies, is more tightly concentrated around the DC (o Hz) frequency. This concentration at DC is desirable as it represents preserving the baseband signal of interest. Simultaneously, improved alignment leads to a reduction in dithering disturbance, which manifests as unwanted frequency components in the mixer output. These unwanted components, when present, can interfere with the accurate recovery of the transmitted information. Thus, achieving better alignment not only enhances the desired signal by focusing energy at DC but also minimizes the disruptive effects of dithering, ultimately leading to more reliable and efficient ASK demodulation in the wireless power system 100.

Conventionally, a local oscillator that operates at a fixed "mean" frequency without implementing dithering has been utilized. The traditional approach relies on additional band-stop or notch filtering to remove harmonics associated with dithering disturbance in the received signal. While the conventional approach can mitigate some of the issues caused by frequency dithering, it has significant drawbacks. If dedicated notch filters are incorporated into the ASK demodulator architecture, they require additional chip area, increasing the overall size and potentially the cost of the device. Alternatively, if programmable filters, such as Infinite Impulse Response (IIR) filters, are employed to implement the notch filtering, this reduces the degrees of freedom available for low-pass filtering. These limitations can compromise the overall filtering performance of the demodulator, potentially leading to suboptimal signal processing.

Aspects of the disclosure introduce a calibration technique for the local oscillator 412. The proposed calibration process aims to optimize the setup of the local oscillator 412 by focusing on two key aspects of the downconverted signal, specifically when no amplitude modulation is present. First, it seeks to maximize the DC component of the downconverted signal, which represents the desired baseband information. Second, it strives to minimize the dithering component, which manifests as unwanted distortion in the downconverted signal. By adjusting the parameters of the local oscillator 412, such as its initial phase and dithering pattern, the calibration algorithm iteratively searches for a configuration that best achieves these dual objectives.

The proposed approach advantageously ensures that when actual amplitude-modulated signals are received, the ASK demodulator circuit 408 is optimally prepared to extract the transmitted information with minimal distortion from the dithering process. In embodiments, the calibration is performed during periods of no communication, allowing the wireless power system 100 to adapt to the specific characteristics of the wireless power transfer channel without interfering with data transmission.

In embodiments, the calibration process for the local oscillator 412 involves analyzing the I and Q components of the downconverted signal. The firmware processes the samples to compute their Discrete Fourier Transform (DFT) spectra at specific target frequencies, namely the DC and dithering harmonics. For each frequency of interest, a complex vector with elements $I_f$ and cap $Q_f$ is generated.

The energy at each frequency can be estimated by calculating the norm square of the vector, represented as $$N_f^2 = \left\{ \left\| \begin{pmatrix} I_f \\ Q_f \end{pmatrix} \right\|_2 \right\}^2 = |I_f|^2 + |Q_f|^2.$$

The proposed calibration employs a generic metric (C), calculated as $$C = N_{DC}^2 - \sum\nolimits_{K=1}^{M} N_{dithering\_K}^2,$$

where $$N_{DC}^2$$

is the energy contribution at DC and $$N_{dithering\_K}^2$$

is the energy contribution of the $k^{th}$ dithering harmonic, where the sum $$\sum\nolimits_{K=1}^{M} N_{dithering\_K}^2$$

includes contributions from M dithering harmonics within the ASK signal's target bandwidth, typically extending up to five times the bit rate.

For simplicity, only the fundamental dithering frequency can be considered. In this case, the metric simplifies to $$C = N_{DC}^2 - N_{dithering\_fundamental}^2.$$

Further, in scenarios where only the DC component is of interest, the metric can be further reduced to $$C = N_{DC}^2.$$

Accordingly, the aim of the calibration process is to maximize the difference between the lengths of two vectors: one representing the DC component and the other representing the dithering fundamental. The maximization aims to achieve the best possible alignment between the local oscillator 412 and the incoming signal from ADC 406, thereby optimizing the demodulation performance. The process iteratively adjusts the local oscillator parameters to find the configuration that yields the highest metric value, indicating the most effective suppression of dithering disturbances and enhancement of the desired signal component.

Figure 6:
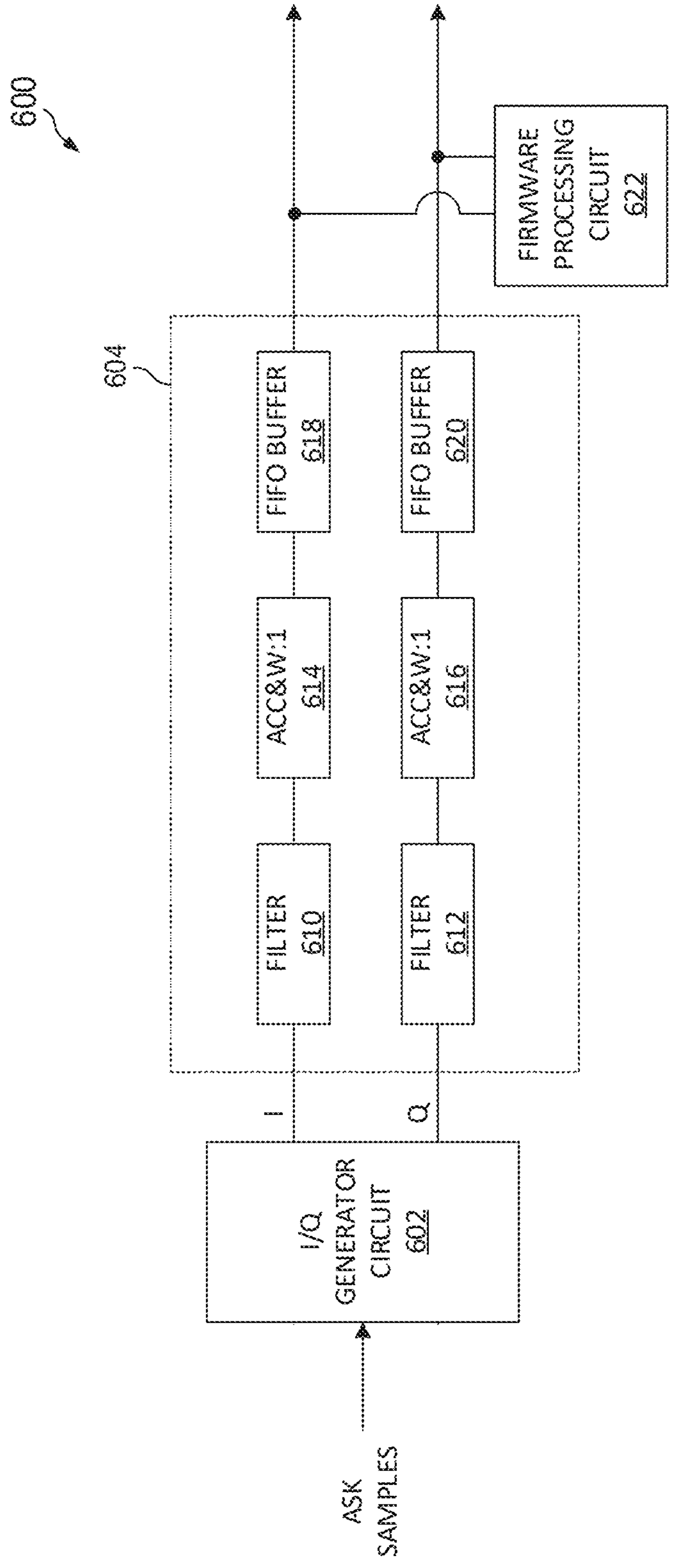
FIG. 6 is a block diagram of an embodiment signal processing chain.

FIG. 6 illustrates a block diagram of an embodiment signal processing chain 600. Signal processing chain 600 includes an I/Q generator circuit 602, a filtering and First-In-First-Out (FIFO) buffer circuit 604, and the firmware processing circuit 622, which may (or may not) be arranged as shown. Signal processing chain 600 may include additional components not shown, such as bandpass filters, IIR filters, scalars, input adapters, counters, amplifiers, edge detector circuits, and bit decoders.

In embodiments, I/Q generator circuit 602 is implemented in the local oscillator 412. It receives the ASK samples from ADC 406 or interface 414 and generates the in-phase (I) and quadrature (Q) components of the incoming sinusoidal signal. The I and Q components represent the reference signal that should match the carrier of the incoming ASK signal, including its dithering pattern. The I/Q generator circuit 602 produces the sine and cosine waveforms needed for demodulation.

The output of the I/Q generator circuit 602 is coupled to the filtering and FIFO buffer circuit 604, which receives the I and Q components. In embodiments, filtering and FIFO buffer circuit 604 interfaces the hardware demodulation chain and the firmware processing circuit 622. Filtering and FIFO buffer circuit 604 enables the calibration algorithm to access the necessary signals from various points in the hardware demodulation chain, facilitating the iterative process of finding the optimal setup for the local oscillator 412 for improved ASK demodulation.

In embodiments, filtering and FIFO buffer circuit 604 includes an optional first filter 610, an optional second filter 612, a first ACC&W:1 circuit 614, a second ACC&W:1 circuit 616, a first FIFO buffer 618, and a second FIFO buffer 620.

In embodiments, the first filter 610 and the second filter 612 filter incoming signals. The first filter 610 and the second filter 612 may be implemented as an Infinite Impulse Response (IIR) filter. In embodiments, the first filter 610 and the second filter 612 are low-pass filters, attenuating high-frequency components of the incoming signal to remove noise and unwanted harmonics. The filtering action can help shape the frequency response of the demodulated signal, optimizing it for subsequent processing stages. The first filter 610 and the second filter 612 can also provide bandwidth limitation, focusing on the frequency range that contains the desired information while improving the overall signal-to-noise ratio by removing out-of-band noise. Further, the first filter 610 and the second filter 612 can serve an anti-aliasing function by restricting the signal bandwidth.

Each ACC&W:1 circuit is a processing unit that can perform accumulation and decimation functions. The "ACC" stands for accumulator, while "W:1" indicates a decimation ratio, where W samples are combined to produce one output sample. Each ACC&W:1 circuit operates by summing W consecutive input samples and outputting the result, effectively reducing the data rate by a factor of W. The primary function of each ACC&W:1 circuit is to perform low-pass filtering and data rate reduction, which helps isolate the desired baseband signal and reduce the computational load on subsequent processing stages. By accumulating samples, it attenuates high-frequency components and noise, while the decimation aspect allows for more efficient signal processing at a lower sample rate. Each ACC&W:1 circuit can be implemented in hardware to ensure real-time processing capabilities. The specific value of W can be adjusted based on the system requirements, balancing between noise reduction, signal preservation, and desired output data rate.

The first FIFO buffer 618 and the second FIFO buffer 620 are coupled to the outputs of the first ACC&W:1 circuit 614 and the second ACC&W:1 circuit 616, respectively. Each FIFO buffer provides a data storage queue based on the first-in, first-out principle. It temporarily stores the samples selected by the multiplexer to which it is coupled, allowing for asynchronous data transfer between the high-speed hardware demodulation chain and the potentially slower firmware processing circuit 622. Each FIFO buffer has a defined depth, determining how many samples it can store before overflowing.

During calibration, the first multiplexer 606 and the second multiplexer 608 are configured by the firmware processing circuit 622 to select the appropriate signals from the hardware demodulation chain. As samples are produced by the selected point in the hardware demodulation chain, they are sequentially written into the first FIFO buffer 618 and the second FIFO buffer 620. As executed by the firmware processing circuit 622, the firmware can then read the samples from the first FIFO buffer 618 and the second FIFO buffer 620 at its own pace, ensuring no data is lost due to timing mismatches between the hardware and software components.

In embodiments, filtering and FIFO buffer circuit 604 can include control signals and status flags. For example, filtering and FIFO buffer circuit 604 may include a FIFO full flag, a FIFO empty flag, and an interrupt signal that can be triggered when a FIFO buffer contains data or reaches a certain fill level. The signals allow the firmware to efficiently manage the data transfer process, reading available samples and processing them without polling the hardware constantly.

The proposed calibration technique ensures that the local oscillator 412 is optimally aligned with the digital signal from the ADC 406 or the interface 414—the digital signal from the ADC being a digital signal corresponding to a voltage of the transmitter coil 112 in a wireless power system 100 implemented with frequency dithering. The alignment of the local oscillator 412 with the digital signal from the ADC 406 or the interface 414 improves the overall demodulation performance in the wireless power system 100.

Further, the calibration process for the local oscillator 412 is designed to ensure accurate and consistent results across various operating conditions. Since the output of the mixer 410 is directly influenced by the amplitude of the input sine waves (i.e., the output of the local oscillator 412 and the digital signal from the ADC 406), the calibration metric is calculated when no amplitude modulation is present. This approach guarantees that the metric outcomes are not skewed by variations in the carrier amplitude, providing a more reliable basis for comparison. Accordingly, in embodiments, the calibration routine is executed during the silent time between ASK communications. According to the Qi standard for wireless power transfer, this silent period has a minimum duration of 6 milliseconds, with a target duration of 7 milliseconds, providing sufficient time for the calibration process.

In embodiments, the calibration process employs the same low-pass filtering setup used in normal ASK demodulation to maintain consistency with real-world operating conditions. This ensures that the effects of unwanted harmonics are accurately represented during calibration, mirroring the conditions present in actual demodulation scenarios. However, the system allows flexibility in choosing the low-pass filter if it meets two critical criteria: preserving the DC and dithering harmonics while adequately attenuating potential aliasing noise harmonics in the baseband. The flexibility allows for filter design optimization based on specific system requirements or constraints.

In embodiments, firmware calculates the calibration metric using the square of the norm (magnitude) of the complex spectral components. Advantageously, this approach avoids the computationally expensive square root operation that would be required if the actual magnitude were used. By using the square of the norm, the firmware can perform the necessary calculations more efficiently, reducing processing time and potentially lowering power consumption. The optimization is particularly advantageous given the limited time available for calibration during the silent period and the potential resource constraints of the embedded system.

Figure 7:
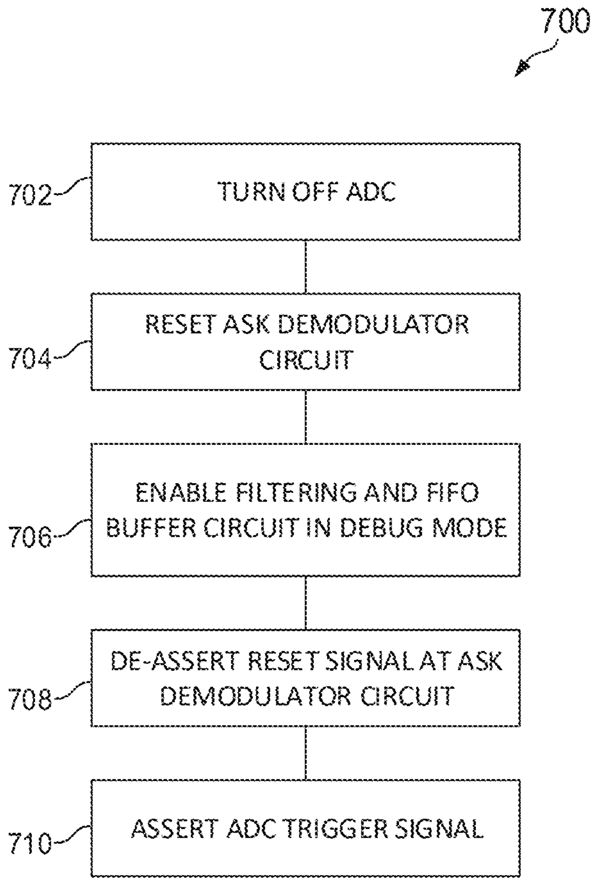
FIG. 7 is a flow chart of embodiment method for an initialization routine for the signal processing chain of FIG. 6.

FIG. 7 illustrates a flow chart of embodiment method 700 for an initialization routine for signal processing chain 600. The calibration routine initializes ADC 406, ASK demodulator circuit 408, and the filtering and FIFO buffer circuit 604. It is noted that all steps outlined in the flow chart of method 700 are not necessarily required and can be optional. Further, changes to the arrangement of the steps, removal of one or more steps and path connections, and addition of steps and path connections are similarly contemplated.

At step 702, if the ADC 406 is ON, it is turned OFF.

At step 704, ASK demodulator circuit 408 is reset, setting the initial values for the counters associated with the dithering table 506. In embodiments, ASK demodulator circuit 408 is reset through a software-generated reset signal. In embodiments, the initial values of the counters are controlled by firmware.

In embodiments, the counters of the ASK demodulator circuit 408 include an ASKD index counter to keep track of the current position in the dithering table 506, an ASKD repetition counter to track how many times the current table entry has been used, and an ASKD period counter to count up to the ARR value for each carrier cycle. In embodiments, the value of the ASKD index counter is reset to HW_INIT_IDX, the value of the ASKD repetition counter is reset to HW_INIT_REP, and the value of the ASKD period counter is reset to HW_INIT_CNT.

At step 706, filtering and FIFO buffer circuit 604 is enabled in debug mode.

At step 708, the reset signal at the ASK demodulator circuit 408 is de-asserted-without starting the ADC 406.

At step 710, microcontroller 302 asserts the ADC trigger signal to start the ADC 406 and the demodulation with the ASK demodulator circuit 408 at the beginning of the PWM dithering pattern. At the beginning of the PWM dithering pattern, the value of the PWM index counter is 0 (i.e., PWM_IDX equals 0), the value of the PWM repetition counter is 0 (i.e., PWM_REP equals 0), and the value of the PWM period counter is 0 (i.e., PWM_CNT equals 0).

Figure 8:
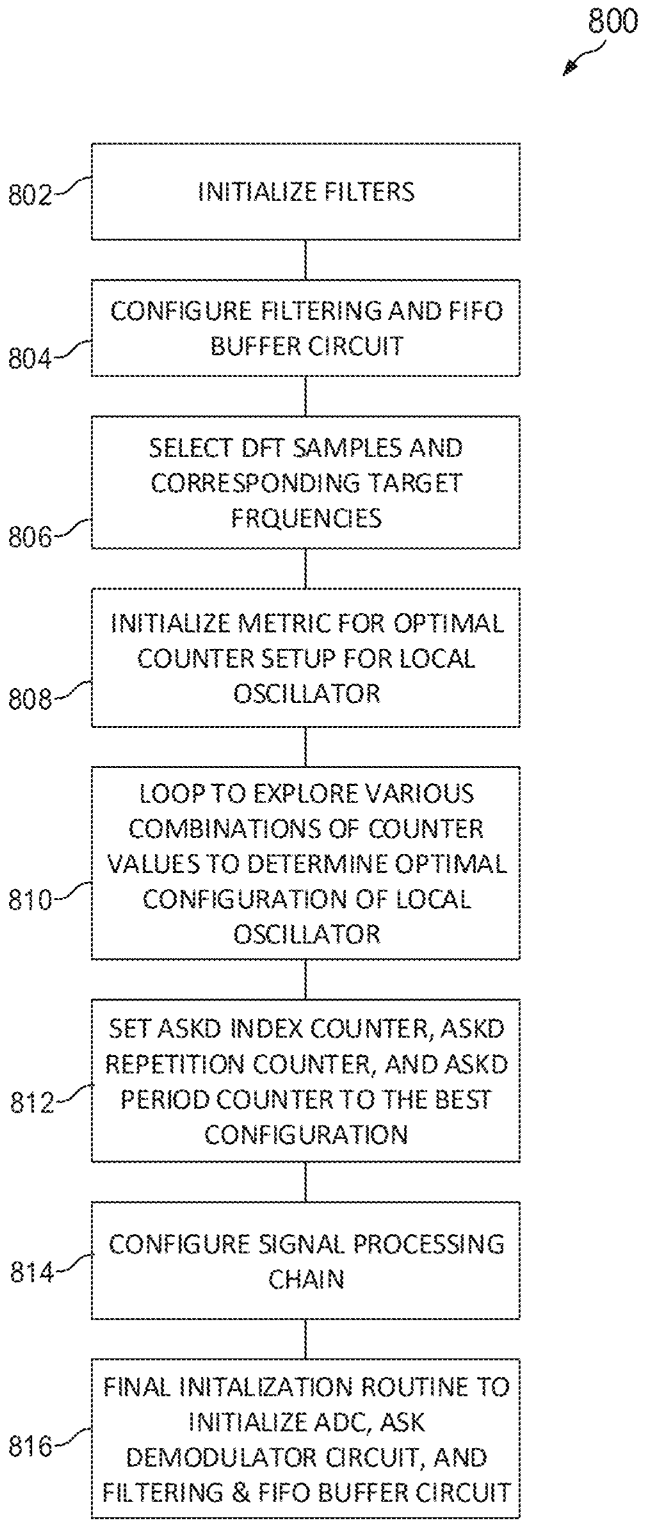
FIG. 8 is a flow chart of an embodiment method, which may be implemented to calibrate a local oscillator.

FIG. 8 illustrates a flow chart of an embodiment method 800, which may be implemented to calibrate local oscillator 412. It is noted that all steps outlined in the flow chart of method 800 are not necessarily required and can be optional. Further, changes to the arrangement of the steps, removal of one or more steps and path connections, and addition of steps and path connections are similarly contemplated.

In embodiments, method 800 utilizes the I and Q samples outputted by the first ACC&W:1 circuit 614 and the second ACC&W:1 circuit 616 to compute various metrics. In embodiments, the first ACC&W:1 circuit 614 and the second ACC&W:1 circuit 616 perform an additional low-pass filtering operation, complementing the initial filtering done by the first filter 610 and the second filter 612. Further, the first ACC&W:1 circuit 614 and the second ACC&W:1 circuit 616 incorporate sample decimation, effectively reducing the signal's data rate. The data rate reduction transforms all subsequent signals into what is referred to as the low-speed domain.

The first FIFO buffer 618 and the second FIFO buffer 620 facilitate observing and capturing the low-speed I and Q downconversion signals. The FIFO buffers serve as an interface between the hardware processing components and the firmware processing circuit 622. Depending on the system's requirements, the firmware processing circuit 622 can be implemented using various processor options, such as general-purpose microprocessors or dedicated digital signal processors.

An advantage of the architecture is that the reduced data rates in the low-speed domain are sufficiently manageable to ensure seamless interfacing with the firmware processing circuit 622. The design characteristic prevents data loss during the transfer from the hardware components to the firmware processing stage, which can be crucial for accurate calibration and overall system performance. The combination of hardware filtering, decimation, and buffering, followed by firmware processing, allows for efficient and precise calibration of the ASK demodulator system.

At step 802, the first filter 610 and the second filter 612 of the signal processing chain 600 are initialized by setting their coefficients, for example, to prepare for signal processing. In embodiments, any additional filters in the signal chain that may be included, which are not shown in FIG. 6, are initialized.

At step 804, the filtering and FIFO buffer circuit 604 is configured to capture outputs from the I and Q components through the first ACC&W:1 circuit 614 and the second ACC&W:1 circuit 616, enabling firmware to acquire demodulator outcomes.

At step 806, the number of Discrete Fourier Transform (DFT) samples and corresponding target frequencies are selected by, for example, the firmware processing circuit 622. Computational complexity and spectral accuracy can be balanced by selecting an appropriate number of samples and target frequencies. A larger number of DFT sample values provides more detailed spectral information but requires more processing time and resources. The target frequencies are typically chosen to capture essential signal characteristics, including the DC component and the relevant dithering harmonics, while avoiding aliasing effects. In embodiments, the number of DFT samples can range between 20 and 100. In embodiments, the number of DFT samples is equal to 50.

The number of DFT samples and the corresponding target frequencies help determine the accuracy and resolution of the spectral analysis performed during calibration. A higher number of DFT samples generally leads to better frequency resolution in the DFT output, allowing for more precise identification of spectral components. The increased resolution can help distinguish between closely spaced frequency components, such as the DC component and the dithering fundamental frequency. The choice of target frequencies determines which spectral components are analyzed, typically focusing on the DC component and the dithering harmonics relevant to the ASK signal's bandwidth.

At step 808, a metric associated with the optimal counter setup of the local oscillator 412 is initialized by, for example, the firmware processing circuit 622 to, for example, the most negative value, establishing a baseline for comparison in the search for optimal configuration.

At step 810, method 800 enters a loop that explores various combinations of counter values. In embodiments, the counter values set by the firmware include an FW index counter value associated with the index value of the dithering table 506, an FW repetition counter value associated with the repetition value of the dithering table 506, and an FW period counter value associated with the period value of the dithering table 506.

During the exploration sequence, various combinational values are given by, for example, the firmware processing circuit 622 to the FW index counter value, the FW repetition counter value, and the FW period value. At each loop, the value of the ASKD index counter is set to equal the current FW index counter value, the value of the ASKD repetition counter is set to equal the current FW repetition counter value, and the value of the ASKD period counter is set to equal the current FW period counter value.

Further, an initialization routine is performed at each loop to initialize ADC 406, ASK demodulator circuit 408, and the filtering and FIFO buffer circuit 604. In embodiments, the initialization routine may follow method 700.

Within each loop, samples from both I and Q channels are processed, incrementing counters (i.e., counters associated with the I and Q channels processed) for each channel until the required number of DFT samples is reached. In embodiments, the I and Q channels are processed in parallel. Once sufficient samples are collected, the ADC 406 is stopped, and the current metric for the loop is computed using DFT-based spectral analysis.

If the computed current metric surpasses the best metric (i.e., metric associated with the optimal counter setup of the local oscillator 412) found so far, the metric associated with the optimal counter setup of the local oscillator 412 is updated with the current metric, and the corresponding values for the FW index counter value, the FW repetition counter value, and the FW period counter value are stored as the best configuration.

After each iteration, variables associated with spectral calculations are reset, and the process moves to the next combination of the FW index counter value, the FW repetition counter value, and the FW period counter value.

At step 812, after exploring all combinations for the FW index counter value, the FW repetition counter value, and the FW period counter value, the values of the ASKD index counter, the ASKD repetition counter, and the ASKD period counter are respectively set to the FW index counter value, the FW repetition counter value, and the FW period counter value determined as the best configuration found at step 810.

At step 814, the signal processing chain 600 and associated components (e.g., filters, comparators, distance counters, etc.) are configured. In embodiments, step 814 is performed at step 802.

At step 816, a final initialization routine is performed to initialize ADC 406, ASK demodulator circuit 408, and the filtering and FIFO buffer circuit 604. In embodiments, the initialization routine may follow method 700.

In embodiments, the firmware through the firmware processing circuit 622, manages various variables, including dithering table indices, repetition values, and counters, for exploration and for tracking the best configuration. Method 800 effectively balances hardware operations with firmware control to achieve optimal ASK demodulation performance in the presence of frequency dithering.

Figure 9:
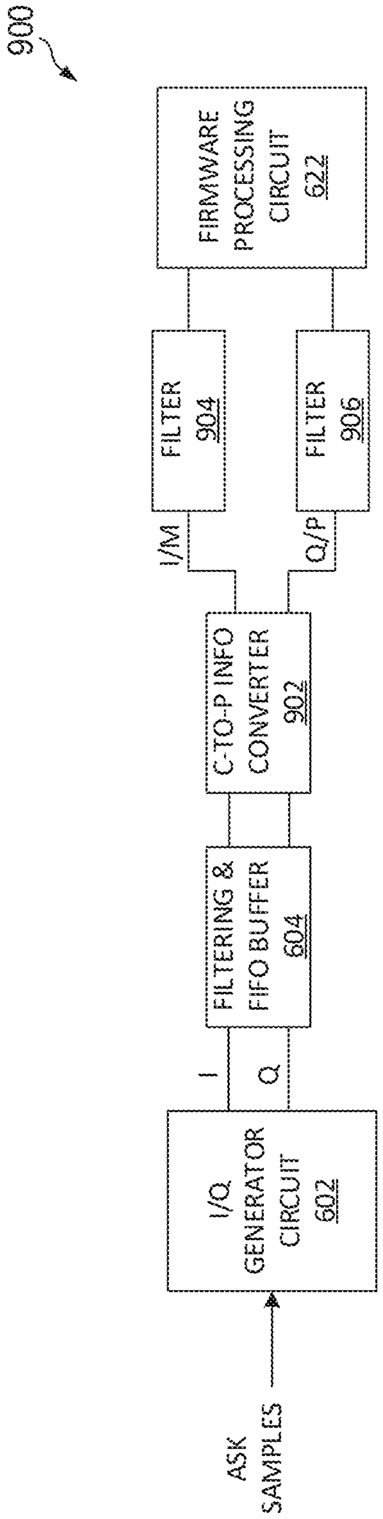
FIG. 9 is a block diagram of an embodiment signal processing chain.

FIG. 9 illustrates a block diagram of an embodiment signal processing chain 900. In this embodiment, the signal processing chain 900 introduces a DC-only solution for ASK demodulation and calibration. By leveraging the fact that the DFT for the DC component is simply a sum of samples, by using, for example, Cascaded Integrator-Comb (CIC) filters, which inherently perform sample accumulation, the DC component of the I and Q channels are computed. The approach bypasses the need for complex DFT calculations across multiple frequencies, focusing solely on the DC component.

Signal processing chain 900 includes the I/Q generator circuit 602, the filtering and FIFO buffer circuit 604, the firmware processing circuit 622, a Cartesian-to-polar information converter 902, a third filter 904, and a fourth filter 906, which may (or may not) be arranged as shown. Signal processing chain 900 may include additional components not shown, such as bandpass filters, IIR filters, scalars, input adapters, counters, amplifiers, and edge detector circuits.

Functional and structural descriptions of components previously discussed with respect to the signal processing chain 600 and having the same element number are not repeated for brevity.

The I and Q channels at the output of the first ACC&W:1 circuit 614 and the second ACC&W:1 circuit 616 are provided as inputs to the Cartesian-to-polar information converter 902, a specialized digital signal processing component. In embodiments, Cartesian-to-polar information converter 902 is configured in bypass mode by the firmware processing circuit 622 to guarantee that the decimated I and Q signals can be accumulated.

In embodiments, Cartesian-to-polar information converter 902 takes the decimated I and Q samples from the first ACC&W:1 circuit 614 and the second ACC&W:1 circuit 616 and performs vector rotations to convert the Cartesian coordinates (I and Q) into polar coordinates (magnitude and phase). This conversion is useful in ASK demodulation as it allows extracting the amplitude information (magnitude) from the complex signal for decoding ASK modulated data. The phase information can be used for various purposes such as frequency offset estimation or phase error correction. It should be appreciated that the function of the Cartesian-to-polar information converter 902 can be implemented using other signal processing components and is not limited to a CORDIC Magnitude/Phase generator circuit.

The in-phase magnitude component (I/M) at the output of the Cartesian-to-polar information converter 902 is fed to the third filter 904. The quadrature phase component (Q/P) at the output of the Cartesian-to-polar information converter 902 is fed to the fourth filter 906. The third filter 904 and the fourth filter 906 further reduce the data rate and accumulate samples, implementing a low-pass filtering operation. The accumulation is equivalent to computing the DC component of the signal. The outputs of the third filter 904 and the fourth filter 906 are fed to the firmware processing circuit 622. The third filter 904 and the fourth filter 906 may be implemented as CIC filters. In embodiments, the third filter 904 and the fourth filter 906 are implemented as first-order CIC filters.

Figure 10:
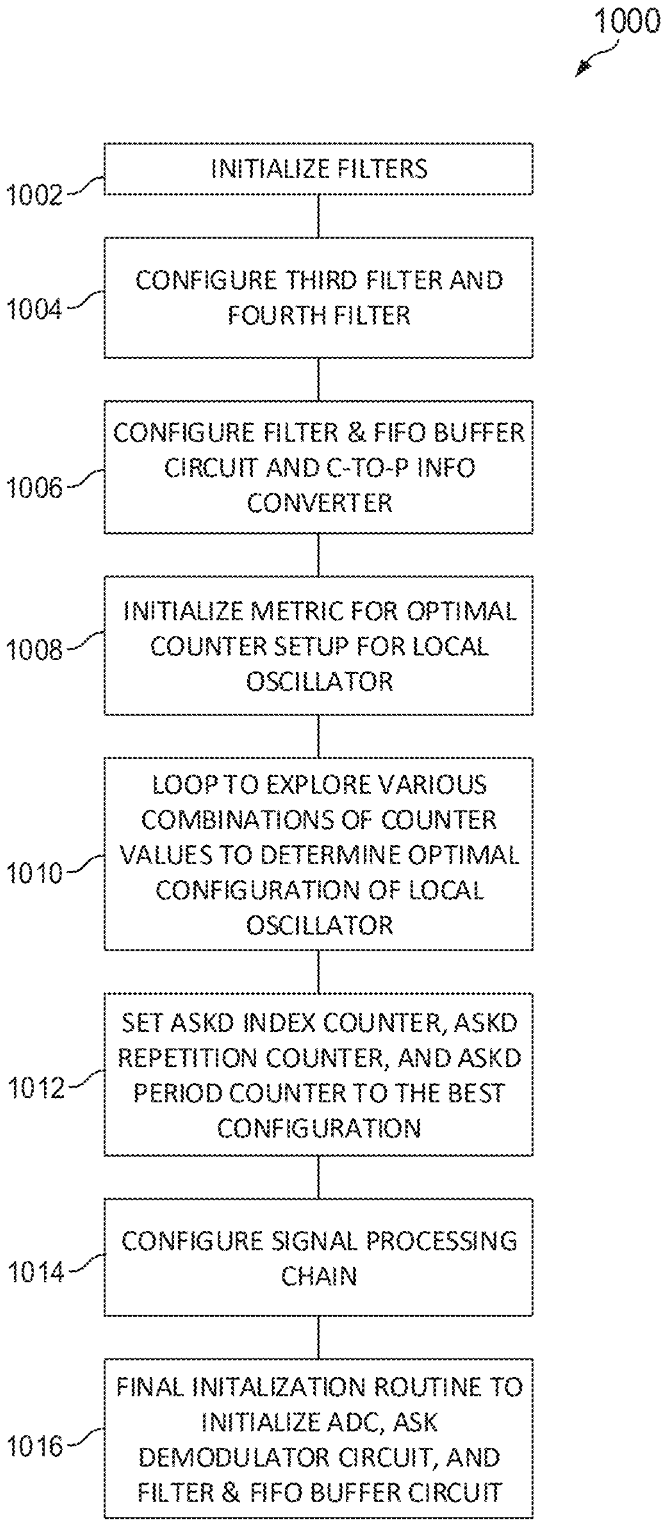
FIG. 10 is a flow chart of an embodiment method, which may be implemented to calibrate a local oscillator.

FIG. 10 illustrates a flow chart of an embodiment method 1000, which may be implemented to calibrate local oscillator 412. It is noted that all steps outlined in the flow chart of method 1000 are not necessarily required and can be optional. Further, changes to the arrangement of the steps, removal of one or more steps and path connections, and addition of steps and path connections are similarly contemplated.

Method 1000 outlines a streamlined approach for calibrating the local oscillator 412, focusing on a DC-only solution. In embodiments, method 1000 utilizes the outputs of the third filter 904 and the fourth filter 906 to compute various metrics. For example, the DC-only metric $$(C = N_{DC}^2)$$

can be computed using the outputs of the third filter 904 and the fourth filter 906. The firmware processing circuit 622 receives the accumulated $I_{DC}$ and $Q_{DC}$ values from the third filter 904 and the fourth filter 906 and calculates the DC-only metric by computing $$I_{DC}^2 + Q_{DC}^2.$$

The simplification reduces the computational load on the firmware processing circuit 622 and advantageously speeds up the calibration process.

At step 1002, the first filter 610 and the second filter 612 of the signal processing chain 900 are initialized by setting their coefficients, for example, to prepare for signal processing. In embodiments, any additional filters in the signal chain that may be included, which are not shown in FIG. 9, are initialized.

At step 1004, the third filter 904 and the fourth filter 906, associated with the I and Q channels are configured with a decimation factor equal to the number of DFT samples used for spectral analysis.

At step 1006, filtering and FIFO buffer circuit 604 and the Cartesian-to-polar information converter 902 are configured to capture outputs from the I and Q components through the I-chain and Q-chain filters (i.e., the third filter 904 and the fourth filter 906) at the firmware processing circuit 622 to enable the firmware to access the processed signals.

At step 1008, a metric associated with the optimal counter setup of the local oscillator 412 is initialized by, for example, the firmware processing circuit 622 to, for example, the most negative value, establishing a baseline for comparison in the search for optimal configuration.

At step 1010, method 1000 enters a loop that explores various combinations of counter values. In embodiments, the counter values set by the firmware include an FW index counter value associated with the index value of the dithering table 506, an FW repetition counter value associated with the repetition value of the dithering table 506, and an FW period counter value associated with the period value of the dithering table 506.

During the exploration sequence, various combinational values are given to the FW index counter value, the FW repetition counter value, and the FW period value. At each loop, the value of the ASKD index counter is set to equal the current FW index counter value, the value of the ASKD repetition counter is set to equal the current FW repetition counter value, and the value of the ASKD period counter is set to equal the current FW period counter value.

Further, an initialization routine is performed at each loop to initialize ADC 406, ASK demodulator circuit 408, and the filtering and FIFO buffer circuit 604. In embodiments, the initialization routine may follow method 700.

Within each loop, a new pair of samples from the I and Q channels is received, which stops the ADC 406. The current metric for the loop is computed using the outputs of the third filter 904 and the fourth filter 906, which effectively provide the signal's DC components.

If the computed current metric surpasses the best metric (i.e., the metric associated with the optimal counter setup of the local oscillator 412) found so far, the metric associated with the optimal counter setup of the local oscillator 412 is updated with the current metric, and the corresponding values for the FW index counter value, the FW repetition counter value, and the FW period counter value are stored as the best configuration.

After each iteration, the process moves to the next combination of the FW index counter value, the FW repetition counter value, and the FW period counter value.

At step 1012, after exploring all combinations for the FW index counter value, the FW repetition counter value, and the FW period counter value, the values of the ASKD index counter, the ASKD repetition counter, and the ASKD period counter are respectively set to the FW index counter value, the FW repetition counter value, and the FW period counter value determined as the best configuration found at step 1010.

At step 1014, the signal processing chain 900 and associated components (e.g., filters, comparators, distance counters, etc.) are configured. In embodiments, step 1014 can be performed at step 1002.

At step 1016, a final initialization routine is performed to initialize ADC 406, ASK demodulator circuit 408, and the filtering and FIFO buffer circuit 604. In embodiments, the initialization routine may follow method 700.

In embodiments, the firmware through the firmware processing circuit 622, manages various variables, including dithering table indices, repetition values, and counters, for exploration and for tracking the best configuration. Method 1000 utilizes filters 904 and 906 to compute the DC-only metric efficiently. The firmware processing circuit 622 receives the accumulated $I_{DC}$ and $Q_{DC}$ values and calculates the DC-only metric, simplifying the computation and speeding up the calibration process.

Figure 11:
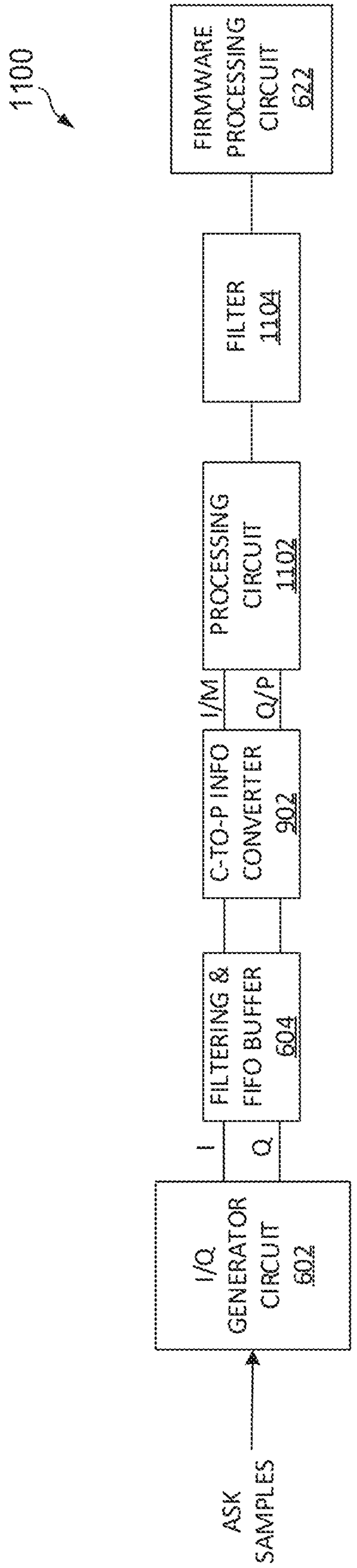
FIG. 11 is a block diagram of an embodiment signal processing chain.

FIG. 11 illustrates a block diagram of an embodiment signal processing chain 1100. In the embodiment, the signal processing chain 1100 introduces a DC-only solution for ASK demodulation and calibration.

In the absence of amplitude modulation, even though the DC-only metric $$I_{DC}^2 + Q_{DC}^2 = \left[\left(\sum\nolimits_{m=0}^{M-1} I_m\right)^2 + \left(\sum\nolimits_{m=0}^{M-1} Q_m\right)^2\right]$$

does not equal $$\sum\nolimits_{m=0}^{M-1} (I_m^2 + Q_m^2),$$

the accumulation of the magnitude signal $$\sum\nolimits_{m=0}^{M-1} \sqrt{I_m^2 + Q_m^2})$$

can be exploited as a simplified DC-only metric, as higher magnitude is expected to be associated with a higher alignment.

Signal processing chain 1100 includes the I/Q generator circuit 602, the filtering and FIFO buffer circuit 604, the firmware processing circuit 622, the Cartesian-to-polar information converter 902, the processing circuit 1102, and a third filter 1104, which may (or may not) be arranged as shown. Signal processing chain 1100 may include additional components not shown, such as bandpass filters, IIR filters, scalars, input adapters, counters, amplifiers, and edge detector circuits. Functional and structural descriptions of components previously discussed with respect to the signal processing chain 600 and signal processing chain 900 and having the same element number are not repeated for brevity.

The in-phase (I) and quadrature (Q) components are fed to the Cartesian-to-polar information converter 902. Cartesian-to-polar information converter 902 computes the magnitude $$\sqrt{I^2 + Q^2}$$

for the current I/Q samples pair.

The computed value at the output of the processing circuit 1102 is fed to the third filter 1104. The third filter 1104 further reduces the data rate and accumulate samples, implementing a low-pass filtering operation. The output of the third filter 1104 is a magnitude value that is already exploitable as a metric, which is fed to the firmware processing circuit 622. The third filter 1104 may be implemented as a CIC filter. In embodiments, the third filter 1104 is implemented as a first-order CIC filter. In embodiments, the firmware processing circuit 622 optionally computes the magnitude square to enhance metric value differences.

Figure 12:
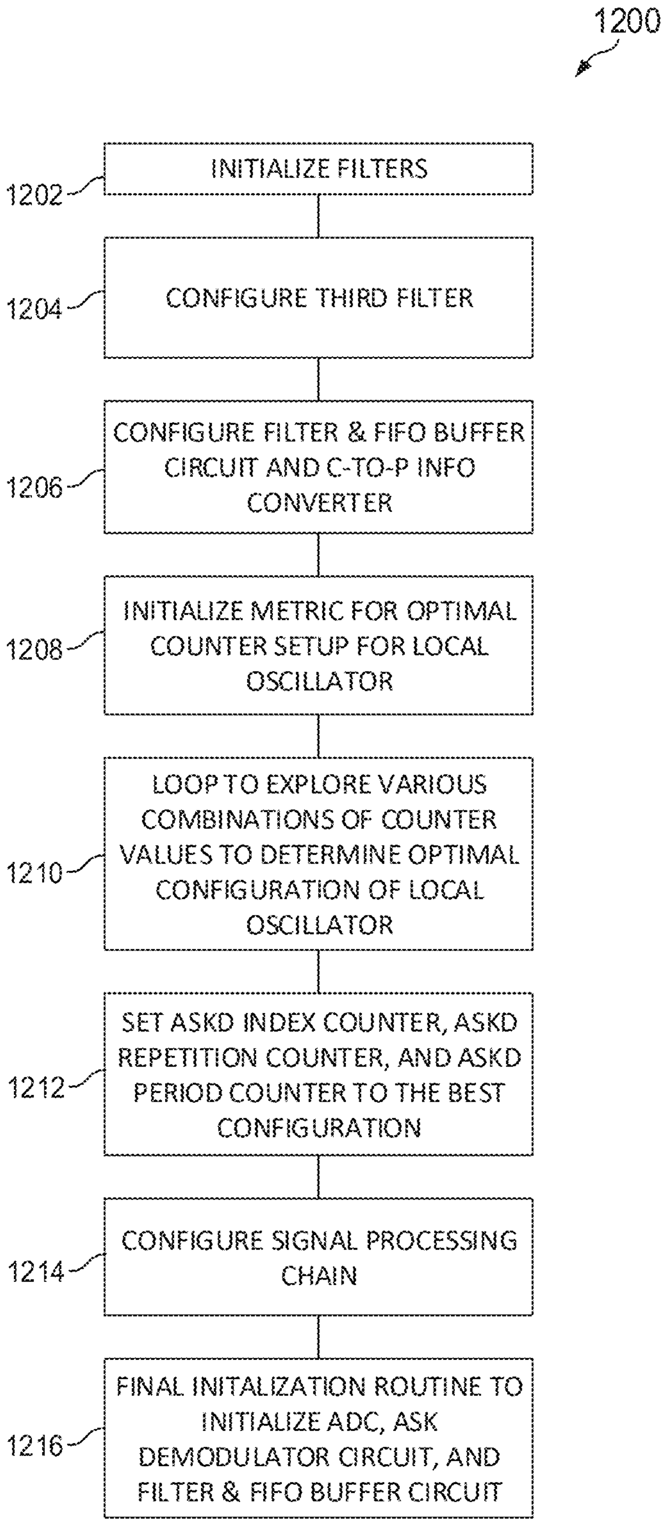
FIG. 12 is a flow chart of an embodiment method, which may be implemented to calibrate a local oscillator.

FIG. 12 illustrates a flow chart of an embodiment method 1200, which may be implemented to calibrate local oscillator 412. It is noted that all steps outlined in the flow chart of method 1200 are not necessarily required and can be optional. Further, changes to the arrangement of the steps, removal of one or more steps and path connections, and addition of steps and path connections are similarly contemplated. Method 1200 outlines another approach for calibrating the local oscillator 412, focusing on a DC-only solution. In embodiments, method 1200 utilizes the output of the third filter 1104, which already includes a viable metric for the firmware processing circuit 622.

At step 1202, the first filter 610 and the second filter 612 of the signal processing chain 1100 are initialized by setting their coefficients, for example, to prepare for signal processing. In embodiments, any additional filters in the signal chain that may be included, which are not shown in FIG. 11, are initialized.

At step 1204, the third filter 1104 is configured with a decimation factor equal to the number of DFT samples used for spectral analysis.

At step 1206, filtering and FIFO buffer circuit 604 and the Cartesian-to-polar information converter 902 are configured so that firmware processing circuit 622 receives the samples from the third filter 1104 with the accumulated values of the magnitude signal $$\sqrt{I^2 + Q^2}.$$

At step 1208, a metric associated with the optimal counter setup of the local oscillator 412 is initialized by, for example, the firmware processing circuit 622 to, for example, the most negative value, establishing a baseline for comparison in the search for optimal configuration At step 1210, method 1200 enters a loop that explores various combinations of counter values. In embodiments, the counter values set by the firmware include an FW index counter value associated with the index value of the dithering table 506, an FW repetition counter value associated with the repetition value of the dithering table 506, and an FW period counter value associated with the period value of the dithering table 506.

During the exploration sequence, various combinational values are given by, for example, the firmware processing circuit 622 to the FW index counter value, the FW repetition counter value, and the FW period value. At each loop, the value of the ASKD index counter is set to equal the current FW index counter value, the value of the ASKD repetition counter is set to equal the current FW repetition counter value, and the value of the ASKD period counter is set to equal the current FW period counter value.

Further, an initialization routine is performed at each loop to initialize ADC 406, ASK demodulator circuit 408, and the filtering and FIFO buffer circuit 604. In embodiments, the initialization routine may follow method 700.

Within each loop, a sample is received from the third filter 1104, which causes the ADC 406 to be stopped. The accumulation of the values of the magnitude signal $$\sqrt{I^2 + Q^2}$$

is associated as the metric for the current sample. In embodiments, the firmware processing circuit 622 computes the square value of the computed value (i.e., $$\left(i.e., I_{DC}^2 + Q_{DC}^2\right)$$

as the metric for the current sample.

If the current metric surpasses the best metric (i.e., metric associated with the optimal counter setup of the local oscillator 412) found so far, the metric associated with the optimal counter setup of the local oscillator 412 is updated with the current metric, and the corresponding values for the FW index counter value, the FW repetition counter value, and the FW period counter value are stored as the best configuration.

After each iteration, the process moves to the next combination of the FW index counter value, the FW repetition counter value, and the FW period counter value.

At step 1212, after exploring all combinations for the FW index counter value, the FW repetition counter value, and the FW period counter value, the values of the ASKD index counter, the ASKD repetition counter, and the ASKD period counter are respectively set to the FW index counter value, the FW repetition counter value, and the FW period counter value determined as the best configuration found at step 1210.

At step 1214, the signal processing chain 1100 and associated components (e.g., filters, comparators, distance counters, etc.) are configured. In embodiments, step 1214 is performed at step 1202.

At step 1216, a final initialization routine is performed to initialize ADC 406, ASK demodulator circuit 408, and the filtering and FIFO buffer circuit 604. In embodiments, the initialization routine may follow method 700.

In embodiments, the firmware through the firmware processing circuit 622, manages various variables, including dithering table indices, repetition values, and counters, for exploration and for tracking the best configuration. Method 1200 utilizes the Cartesian-to-polar information converter 902, the processing circuit 1102, and the third filter 1104 to compute a current metric for a sample from the ADC 406, which can be readily used by the firmware processing circuit 622 without any further computations for the metric, simplifying the computation and speeding up the calibration process.

In the various embodiments, the firmware processing circuit 622 may be implemented as a digital signal processor. The firmware processing circuit 622 may communicate with the ADC 406 to activate and deactivate the ADC. In some embodiments, firmware processing circuit 622 is coupled to the ADC 406, for example, when the ADC 406 belongs to the same chip of the firmware processing circuit 622.

In some embodiments the firmware processing circuit 622 is coupled to the ADC 406 through serial interfaces, such as Inter-Integrated Circuit (I2C), for example, when the ADC 406 does not belong to the same chip of the firmware processing circuit 622. In embodiments, the firmware processing circuit 622 is coupled to the ASK demodulator circuit 408 to assert and de-assert a reset signal.

Figure 13:
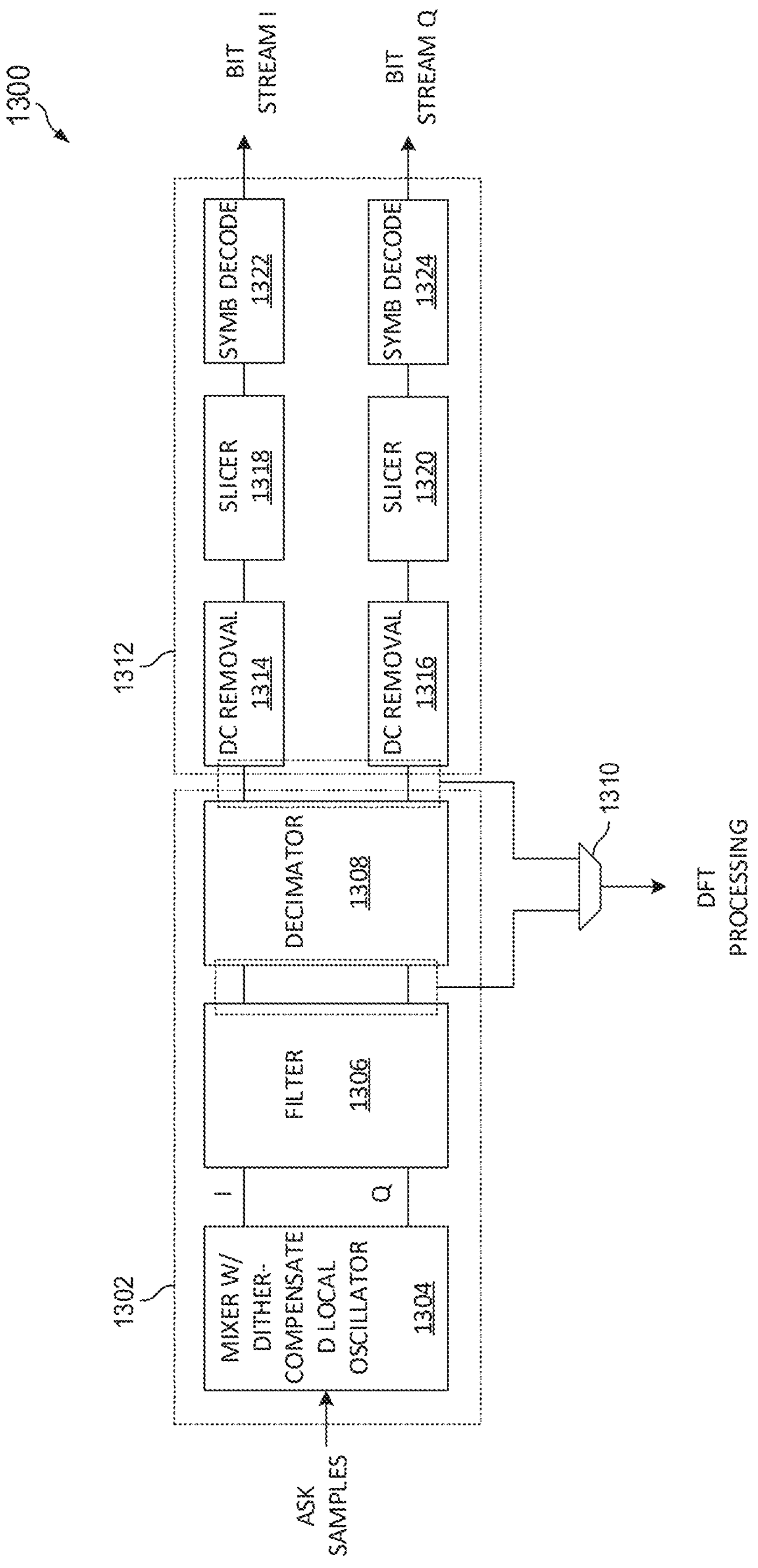
FIG. 13 is a block diagram of an embodiment signal processing chain.

FIG. 13 illustrates a block diagram of an embodiment signal processing chain 1300. The signal processing chain 1300 presents an implementation for ASK demodulation and calibration, where the signal chain is divided into high-speed and low-speed domain circuits. Signal processing chain 1300 includes a high-speed domain circuit 1302 and a low-speed domain circuit 1312, which may (or may not) be arranged as shown. Signal processing chain 1300 may include additional components not shown.

The high-speed domain circuit 1302 receives the ASK samples from the interface 414 and converts the high-speed domain signals to the low-speed domain circuit 1312. High-speed domain circuit 1302 includes a mixer with a dither-compensated local oscillator 1304, a filter 1306, and a decimator 1308. The mixer with dither-compensated local oscillator 1304 can process the ADC samples, generating I and Q components for frequency dithering. The I and Q component signals pass through the filter 1306 (typically a low-pass filter) and the decimator 1308, which reduce noise and data rate respectively. The outputs of the filter 1306 and the decimator 1308 are fed through a multiplexer 1310 to a processor, enabling DFT processing for calibration.

The low-speed domain circuit 1312 receives the down-converted signals and processes them to generate I and Q bit streams. Low-speed domain circuit 1312 includes parallel paths for I and Q components. The first path includes a first DC removal circuit 1314, a first slicer circuit 1318, and a first symbol decoder circuit 1322. The second path includes a second DC removal circuit 1316, a second slicer circuit 1320, and a second symbol decoder circuit 1324 in the Q-chain component path. In embodiments, the first DC removal circuit 1314 and the second DC removal circuit 1316 are implemented as high-pass frequency filters to remove DC offsets. The first slicer circuit 1318 and the second slicer circuit 1320 provide signal quantization. The first symbol decoder circuit 1322 and the second symbol decoder circuit 1324 generate the final bit stream.

The embodiment, advantageously offers flexibility in applying the calibration metric. While the metric is typically applied to the downconverted signal after low-pass filtering, samples can be taken from various points in the chain, including the high-speed domain circuit 1302, depending on data rates and system requirements. This flexibility allows for optimization of processing load and power consumption.

The calibration results can be applied to various types of dither-compensated local oscillators, not limited to those based on the index, repetition, and period counter triplets, as the metric is independent of the specific phase encoding used for frequency dithering. Additionally, the proposed circuit allows for hardware-based DFT processing, with a simple accumulator sufficing for DC component analysis.

The architecture also facilitates easy implementation of ADC control features, such as ON/OFF switching and periodic start conversion commands, enhancing the adaptability to different operational requirements.

In some embodiments, in the ASK demodulation system utilizing frequency dithering, the demodulation process is executed under a synchronous demodulation regime. The approach ensures that the dithering period, calculated as the product of the PWM period (TPWM) and the sum of all adjusted Auto-Reload Register (ARR) values plus one over the complete dithering pattern, is an exact multiple of the sampling period. The synchronization is advantageous to maintain consistency in the sampling process across the entire dithering pattern. Under ideal conditions, where there is no amplitude modulation and external noise is absent, the synchronous sampling technique results in a notable periodicity of the acquired samples.

A first aspect relates to a method for calibrating a local oscillator in an Amplitude Shift Keying (ASK) demodulator of a wireless power transmitter. The method includes receiving a digital signal corresponding to a voltage or a current of a transmitter coil in a wireless power system implemented with frequency dithering; iteratively adjusting counter values associated with a dithering table of the local oscillator; wherein for each iteration, the method comprises generating in-phase (I) and quadrature (Q) components using the local oscillator, computing a metric based on the I and Q components, and storing the counter values if the computed metric surpasses a previously stored best metric; and configuring the local oscillator with the stored counter values associated with the best metric.

In a first implementation form of the method, according to the first aspect as such, the counter values comprise an index counter value associated with an index of the dithering table; a repetition counter value associated with a repetition value of the dithering table; and a period counter value associated with a period of the dithering table.

In a second implementation form of the method, according to the first aspect as such or any preceding implementation form of the first aspect, computing the metric includes performing a Discrete Fourier Transform (DFT) on the I and Q components; calculating energy contributions at DC and at least one dithering harmonic frequency; and determining a difference between the DC energy contribution and the dithering harmonic energy contributions.

In a third implementation form of the method, according to the first aspect as such or any preceding implementation form of the first aspect, computing the metric includes accumulating I and Q samples to compute DC components; and calculating a sum of squares of the DC components.

In a fourth implementation form of the method, according to the first aspect as such or any preceding implementation form of the first aspect, computing the metric includes calculating a magnitude of each I and Q sample pair; and accumulating the calculated magnitudes.

In a fifth implementation form of the method, according to the first aspect as such or any preceding implementation form of the first aspect, the method further includes configuring a filtering and First-In-First-Out (FIFO) buffer circuit to capture outputs from I and Q component processing chains.

In a sixth implementation form of the method, according to the first aspect as such or any preceding implementation form of the first aspect, generating the I and Q components includes using a numerically-controlled oscillator.

In a seventh implementation form of the method, according to the first aspect as such or any preceding implementation form of the first aspect, the method further includes filtering the I and Q components using cascaded integrator-comb (CIC) filters before computing the metric.

A second aspect relates to a circuit for calibrating a local oscillator in an Amplitude Shift Keying (ASK) demodulator of a wireless power transmitter. The circuit includes an analog-to-digital converter (ADC) configured to receive a signal corresponding to a voltage or a current of a transmitter coil in a wireless power system implemented with frequency dithering; a local oscillator configured to generate in-phase (I) and quadrature (Q) components based on counter values associated with a dithering table; and a processing circuit configured to iteratively adjust the counter values, compute a metric based on the I and Q components for each iteration, and store the counter values if the computed metric surpasses a previously stored best metric, wherein the local oscillator is further configured to use the stored counter values associated with the best metric for subsequent operation.

In a first implementation form of the circuit, according to the second aspect as such, the local oscillator comprises an I/Q generator circuit and configured to generate the I and Q components.

In a second implementation form of the circuit, according to the second aspect as such or any preceding implementation form of the second aspect, the circuit further includes a filtering and First-In-First-Out (FIFO) buffer circuit configured to capture outputs from I and Q component processing chains and provide them to the processing circuit.

In a third implementation form of the circuit, according to the second aspect as such or any preceding implementation form of the second aspect, the circuit further includes a Cartesian-to-polar information converter configured to compute magnitude and phase values from the I and Q components.

In a fourth implementation form of the circuit, according to the second aspect as such or any preceding implementation form of the second aspect, the circuit further includes a filter coupled to an output of the Cartesian-to-polar information converter and configured to accumulate magnitude values.

In a fifth implementation form of the circuit, according to the second aspect as such or any preceding implementation form of the second aspect, the processing circuit is further configured to perform a Discrete Fourier Transform (DFT) on the I and Q components; calculate energy contributions at DC and at least one dithering harmonic frequency; and determine the metric as a difference between the DC energy contribution and the dithering harmonic energy contributions.

In a sixth implementation form of the circuit, according to the second aspect as such or any preceding implementation form of the second aspect, the circuit further includes cascaded integrator-comb (CIC) filters coupled to I and Q component processing chains and configured to compute DC components of the I and Q components.

A third aspect relates to a wireless power system. The wireless power system includes a transmitter coil and an Amplitude Shift Keying (ASK) demodulator circuit coupled to the transmitter coil and configured to demodulate backscatter-modulated signals. The ASK demodulator includes a local oscillator implemented with frequency dithering, a calibration circuit configured to receive a digital signal corresponding to a voltage of the transmitter coil; iteratively adjust counter values associated with a dithering table of the local oscillator; and configure the local oscillator with the stored counter values associated with the best metric. For each iteration, the calibration circuit is configured to generate in-phase (I) and quadrature (Q) components using the local oscillator; compute a metric based on the I and Q components; and store the counter values if the computed metric surpasses a previously stored best metric.

In a first implementation form of the wireless power system, according to the third aspect as such, the local oscillator comprises an I/Q generator circuit configured to generate the I and Q components.

In a second implementation form of the wireless power system, according to the third aspect as such or any preceding implementation form of the third aspect, the calibration circuit comprises a filtering and First-In-First-Out (FIFO) buffer circuit configured to capture outputs from I and Q component processing chains.

In a third implementation form of the wireless power system, according to the third aspect as such or any preceding implementation form of the third aspect, the wireless power system further includes a Cartesian-to-polar information converter configured to compute magnitude and phase values from the I and Q components; and a filter coupled to an output of the Cartesian-to-polar information converter and configured to accumulate magnitude values.

In a fourth implementation form of the wireless power system, according to the third aspect as such or any preceding implementation form of the third aspect, the calibration circuit is configured to compute the metric by accumulating I and Q samples to compute DC components; and calculating a sum of squares of the DC components.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for calibrating a local oscillator in an Amplitude Shift Keying (ASK) demodulator of a wireless power transmitter, the method comprising:

receiving a digital signal corresponding to a voltage or a current of a transmitter coil in a wireless power system implemented with frequency dithering;

iteratively adjusting counter values associated with a dithering table of the local oscillator;

wherein for each iteration, the method comprises:

generating in-phase (I) and quadrature (Q) components using the local oscillator, computing a metric based on the I and Q components, and storing the counter values if the computed metric surpasses a previously stored best metric; and configuring the local oscillator with the stored counter values associated with the best metric, wherein the best metric is the metric associated with an optimal counter set up of the local oscillator.

2. The method of claim 1, wherein the counter values comprise:

an index counter value associated with an index of the dithering table;

a repetition counter value associated with a repetition value of the dithering table; and a period counter value associated with a period of the dithering table.

3. The method of claim 1, wherein computing the metric comprises:

performing a Discrete Fourier Transform (DFT) on the I and Q components;

calculating energy contributions at DC and at least one dithering harmonic frequency; and determining a difference between the DC energy contribution and the dithering harmonic energy contributions.

4. The method of claim 1, wherein computing the metric comprises:

accumulating I and Q samples to compute DC components; and calculating a sum of squares of the DC components.

5. The method of claim 1, wherein computing the metric comprises:

calculating a magnitude of each I and Q sample pair; and accumulating the calculated magnitudes.

6. The method of claim 1, further comprising configuring a filtering and First-In-First-Out (FIFO) buffer circuit to capture outputs from I and Q component processing chains.

7. The method of claim 1, wherein generating the I and Q components comprises using a numerically-controlled oscillator.

8. The method of claim 1, further comprising filtering the I and Q components using cascaded integrator-comb (CIC) filters before computing the metric.

9. A circuit for calibrating a local oscillator in an Amplitude Shift Keying (ASK) demodulator of a wireless power transmitter, the circuit comprising:

an analog-to-digital converter (ADC) configured to receive a signal corresponding to a voltage or a current of a transmitter coil in a wireless power system implemented with frequency dithering;

a local oscillator configured to generate in-phase (I) and quadrature (Q) components based on counter values associated with a dithering table; and a processing circuit configured to:

iteratively adjust the counter values, compute a metric based on the I and Q components for each iteration, and store the counter values if the computed metric surpasses a previously stored best metric, wherein the local oscillator is further configured to use the stored counter values associated with the best metric for subsequent operation, wherein the best metric is the metric associated with an optimal counter set up of the local oscillator.

10. The circuit of claim 9, wherein the local oscillator comprises an I/Q generator circuit and configured to generate the I and Q components.

11. The circuit of claim 9, further comprising a filtering and First-In-First-Out (FIFO) buffer circuit configured to capture outputs from I and Q component processing chains and provide them to the processing circuit.

12. The circuit of claim 9, further comprising a Cartesian-to-polar information converter configured to compute magnitude and phase values from the I and Q components.

13. The circuit of claim 12, further comprising a filter coupled to an output of the Cartesian-to-polar information converter and configured to accumulate magnitude values.

14. The circuit of claim 9, wherein the processing circuit is further configured to:

perform a Discrete Fourier Transform (DFT) on the I and Q components;

calculate energy contributions at DC and at least one dithering harmonic frequency; and determine the metric as a difference between the DC energy contribution and the dithering harmonic energy contributions.

15. The circuit of claim 9, further comprising cascaded integrator-comb (CIC) filters coupled to I and Q component processing chains and configured to compute DC components of the I and Q components.

16. A wireless power system, comprising:

a transmitter coil;

an Amplitude Shift Keying (ASK) demodulator circuit coupled to the transmitter coil and configured to demodulate backscatter-modulated signals, the ASK demodulator circuit comprising:

a local oscillator implemented with frequency dithering, a calibration circuit configured to:

receive a digital signal corresponding to a voltage of the transmitter coil;

iteratively adjust counter values associated with a dithering table of the local oscillator;

wherein for each iteration, the calibration circuit is configured to:

generate in-phase (I) and quadrature (Q) components using the local oscillator;

compute a metric based on the I and Q components; and store the counter values if the computed metric surpasses a previously stored best metric;

configure the local oscillator with the stored counter values associated with the best metric, wherein the best metric is the metric associated with an optimal counter set up of the local oscillator.

17. The wireless power system of claim 16, wherein the local oscillator comprises an I/Q generator circuit configured to generate the I and Q components.

18. The wireless power system of claim 16, wherein the calibration circuit comprises a filtering and First-In-First-Out (FIFO) buffer circuit configured to capture outputs from I and Q component processing chains.

19. The wireless power system of claim 16, wherein the wireless power system further comprises:

a Cartesian-to-polar information converter configured to compute magnitude and phase values from the I and Q components; and a filter coupled to an output of the Cartesian-to-polar information converter and configured to accumulate magnitude values.

20. The wireless power system of claim 16, wherein the calibration circuit is configured to compute the metric by:

accumulating I and Q samples to compute DC components; and calculating a sum of squares of the DC components.

* * * * *